US007035899B2

(12) United States Patent
Marchon et al.

(10) Patent No.: US 7,035,899 B2
(45) Date of Patent: Apr. 25, 2006

(54) METHOD AND SYSTEM FOR REMOTE CONFERENCING VIA LAUNCHING A WEB-BASED PRESENTATION SHARING APPLICATION BASED ON CODE ASSOCIATED WITH THE PRESENTATION SHARING CONTROL

(75) Inventors: Donald F. Marchon, Melville, NY (US); Alexander Rockaway, Huntington Station, NY (US); Charles A. Munro, New Westminster (CA); Philip E. Ramsden, Blairstown, NJ (US)

(73) Assignee: Remote Meeting Technologies, Inc., Melville, NY (US)

( * ) Notice: Subject to any disclaimer, the term of this patent is extended or adjusted under 35 U.S.C. 154(b) by 0 days.

(21) Appl. No.: 10/894,329

(22) Filed: Jul. 19, 2004

(65) Prior Publication Data

US 2005/0015719 A1    Jan. 20, 2005

Related U.S. Application Data

(60) Provisional application No. 60/488,589, filed on Jul. 18, 2003.

(51) Int. Cl.
*G06F 15/16* (2006.01)

(52) U.S. Cl. .................... 709/204; 709/218; 709/219

(58) Field of Classification Search ................ 709/203, 709/204, 218, 219, 225; 725/86, 113
See application file for complete search history.

(56) References Cited

U.S. PATENT DOCUMENTS

| 5,991,276 | A | 11/1999 | Yamamoto | |
|---|---|---|---|---|
| 6,433,813 | B1 | 8/2002 | Forkner et al. | |
| 6,560,637 | B1 * | 5/2003 | Dunlap et al. | 709/204 |
| 6,564,380 | B1 * | 5/2003 | Murphy | 725/86 |
| 6,693,661 | B1 | 2/2004 | Vanderwilt et al. | |
| 2002/0104096 | A1 * | 8/2002 | Cramer et al. | 725/113 |
| 2002/0126142 | A1 * | 9/2002 | Hodgkinson | 345/719 |
| 2003/0191838 | A1 * | 10/2003 | Tsao | 709/225 |

OTHER PUBLICATIONS

"Why PlaceWare Web Conferencing?", Microsoft Office Live Meeting, [Retrieved Jul. 19, 2004]. Retrieved from Internet: URL:<http://main.placeware.com/services/why_webconf.cfm>, 6 pages.
"What is Web Conferencing?", Microsoft Office Live Meeting, [Retrieved Jul. 19, 2004]. Retrieved from Internet: URL:<http://main.placeware.com/services/whatis_webconf.cfm>, 1pg.
Video Conferencing, "Bring the power of video conferencing to every desktop", Webex, [Retrieved Jul. 19, 2004]. Retrieved from Internet: URL: <http://www.webex.com/overview/video-conferencing.html >, 2pgs.

(Continued)

*Primary Examiner*—Rupal Dharia
*Assistant Examiner*—Quang N. Nguyen
(74) *Attorney, Agent, or Firm*—Buckley, Maschoff & Talwalkar LLC

(57) ABSTRACT

A system may include a user device to transmit a Web page request a server to transmit a Web page to the user device in response to the request, and a remote video source to receive a request for video data from the user device, and to transmit the video data directly to the user device. The request may be transmitted by the user device using code of the Web page.

28 Claims, 34 Drawing Sheets

OTHER PUBLICATIONS

Pruitt, Scarlet, "Web conferencing comes of age", IDG News Service, Mar. 27, 2003. Network World Fusion, [Retrieved Jul. 1, 2004]. Retrieved from Internet: URL: <http://www.nwfusion.com/cgi-bin/mailto/x.cgi >, 2pgs.

"Videoconferencing Comes of Age with Video-Over-IP", Telecommunications Development Asia—Pacific. [Retrieved Jul. 1, 2004]. Retrieved from Internet: URL: <http://www.tdap.co.uk/uk/archieve/internet/int(polycom_0203).html >. © International Clearing House Ltd 1997-2002. 2pgs.

"ANYONE can now stream video", Home Toys News Release. [Retrieved Jul. 1, 2004]. Retrieved from Internet: URL: <http://www.hometoys.com/releases/aug01/livewave01.html >, 2pgs.

"PCS1600 Set-top Videoconferencing System", Sony Contact 1600. [Retrieved Jul. 1, 2004]. Retrieved from Internet: URL: <http://www.sonycontact.com/features.html <, 2pgs.

* cited by examiner

| SITE ID | PASSWORD | SCHEDULE ADMINISTRATION | | SITE ADMINISTRATION | |
|---|---|---|---|---|---|
| | | USERNAME | PASSWORD | USERNAME | PASSWORD |
| RMT-1 | ADMIN1 | USER1 | P234520 | USER1 | P234520 |
| RMT-2 | GUT9RJ9 | OFFSITE1 | RGBXYZ | USER1 | P234520 |
| RMT-8 | HOUSE | TADPOLE | CMYK | PRINCE | DOCTOR |
| ACME CORP. | 9903REW | ACME-123 | 456-ACME | 456-ACME | ACME-123 |
| ACME SUBSID. | FWD0980 | PASSWORD | USERNAME | NAME | WORD |
| ABC-X | PASSWORD | USERNAME | PASSWORD | 123456 | ABCDEF |

| USERNAME | PASSWORD | GUEST/HOST | MODERATOR | EMAIL ADDRESS | NAME | LOCATION |
|---|---|---|---|---|---|---|
| colspan="7" | KICK-OFF MTG. \| NY BRIEFING ROOM \| CHAIR: D: MARCHON SCHEDULER: D. MARCHON \| July 18, 2004, 9:00 TO 13:00 \| CAMERA ID: RMT-1 | | | | | |
| 4W5VY23 | Q34T34T | HOST | NO | chuck@email.com | CHUCK | Canada |
| 356TY2B4 | E56BY64 | GUEST | NO | dmarchon@rmtcentral.com | DON M. | New York |
| B5TV32VQ | B46YB | GUEST | YES | Ramsden@rmtcentral.com | PHIL | Blairstown, NJ |
| B5TB5H34 | 4B5Y2V5 | HOST | NO | n/a | JANE DOE | n/a |
| V35T35T5 | V256V22V3 | GUEST | NO | john@email.com | JOHN | n/a |

| CAMERA ID | LOCATION NAME | TIME ZONE | PICTURE PARAMETERS | NETWORK PARAMETERS | CAMERA STATE |
|---|---|---|---|---|---|
| RMT-1 | RMT, LLC NY CONFERENCE ROOM A | GMT-05:00 | HIGH QUALITY, COLOR, LARGE, NAMESTAMP, TIMESTAMP, DATESTAMP | IP ADDRESS: 100.200.32.15 TCP PORT: 2000 | P: 0° T: 0° Z: 0X |
| RMT-2 | RMT, LLC NY CONFERENCE ROOM B | GMT-05:00 | MEDIUM QUALITY, COLOR, LARGE, NAMESTAMP, DATESTAMP | IP ADDRESS: 100.200.32.20 TCP PORT: 2000 | P: -80° T: +40° Z: 5X |
| RMT-8 | RMT, LLC LA CONFERENCE ROOM | GMT-08:00 | MEDIUM QUALITY, COLOR, MEDIUM, DATESTAMP | IP ADDRESS: 100.200.64.205 TCP PORT: 1000 | P: 0° T: 0° Z: 0X |
| ACME CORP. | ACME CORPORATION HEADQUARTERS | GMT | LOW QUALITY, MONOCHROME, SMALL | IP ADDRESS: 190.255.132.10 TCP PORT: 18045 | P: +100° T: -25° Z: 10X |

FIG. 8 rmtMeeting Schedule Admin

○ Remote Meeting Technologies, LLC rmtMeeting Scheduling for RMT-1
RMT, LLC, NY Conference Room A

Review Meeting Details

| | |
|---|---|
| Meeting Description | KICK-OFF MEETING |
| Meeting Chairperson | D. MARCHON |
| Meeting Audio phone# | N/A |
| Audio Conf. ID | N/A |
| Audio Conf. password | N/A |
| Meeting start date/time | 7/18/04, 09:00 |
| Meeting end date/time | 7/18/04, 13:00 |

| Username | Password | Moderator? | Guest/Host? | Email address | Name | Location |
|---|---|---|---|---|---|---|
| B5TV32VQ | B46YB | ● | Guest | Ramsden@rmtcentral.com | Phil | Blairstown, NJ |
| 4W5VY23 | Q34T34T | ○ | Host | Chuck@email.com | Chuck | Canada |

[ Add this Meeting ] — 2710

FIG. 27

METHOD AND SYSTEM FOR REMOTE CONFERENCING VIA LAUNCHING A WEB-BASED PRESENTATION SHARING APPLICATION BASED ON CODE ASSOCIATED WITH THE PRESENTATION SHARING CONTROL

CROSS-REFERENCE TO RELATED APPLICATIONS

This application claims priority to Provisional Application Ser. No. 60/488,589, filed Jul. 18, 2003 and entitled "Method and System for Remote Conferencing".

BACKGROUND

1. Field

Embodiments described below generally relate to systems for viewing video data. More specifically, some aspects concern systems for providing video data to a network browser.

2. Discussion

Generally, conventional videoconferencing systems allow at least one meeting participant to view another meeting participant during a meeting. Videoconferencing systems thereby allow businesses to conduct "face-to-face" meetings between parties that are normally located remote from one another. As a result, businesses have saved significant travel-related expenses that would have otherwise been incurred in order to conduct such meetings.

Most videoconferencing systems require the use of specialized hardware at either end of a point-to-point connection (e.g., H.323). In a typical scenario, videoconferencing equipment is professionally installed in a dedicated videoconference room in a first location and in a similarly-dedicated videoconference room in a second location. Meeting participants are summoned to their respective rooms at a scheduled meeting time, and participants in each room are able to watch a video feed of the other room during the meeting.

Webcams have been proposed as a means to provide video images of meeting participants to other meeting participants. A Webcam may connect to a Universal Serial Bus port of a personal computer and send video images to a browser that requests the images from the computer. Webcam functions are incorporated into Web-based conferencing applications such as WebEX™ and LiveMeeting™. These applications may be configured to display a low-resolution, low frames-per-second "headshot" view of a meeting participant on the desktop of another meeting participant.

Each of the foregoing systems presents inadequacies and inefficiencies. Cost, inflexibility, and infrastructure demands are primary shortcomings of the first systems described above. The above-described Web-based systems fail to provide adequate image quality, image control, security, scheduling capability, and/or administrative capability.

BRIEF DESCRIPTION

To address the foregoing, some embodiments concern a system, a method, an apparatus, a computer-readable medium storing processor-executable process steps, and means to receive a Web page request, and transmit a Web page to a user device in response to the request. The Web page may include code usable by a Web browser of the user device to transmit a request for video data to a remote video source and to receive the video data directly from the remote video source. Embodiments may also include transmission of the Web page and a token to the user device, generation of a token, and transmission of the token to the remote video source, wherein the remote video source transmits the video data directly to the user device if the received token is associated with a token received from the user device with the request for video data.

Other embodiments may include transmission of a Web page request, reception of a Web page from a server in response to the request, transmission of a request for video data to a remote video source using code of the Web page, and reception of the video data directly from the remote video source. Also included in such embodiments may be display of the video data within the frame of the Web page in a first video format, display of a video format control based on code of the Web page, receipt of a user selection of the video format control, transmission of a second Web page request based on the selected control, receipt of a second Web page from the server in response to the second request, transmission of a second request for the video data to the remote video source using code of the second Web page, receipt of the video data directly from the remote video source, and display of the video data in a frame of the second Web page in a second video format.

Some embodiments provide a system including a user device to transmit a Web page request, a server to transmit a Web page to the user device in response to the request, and a remote video source to receive a request for video data from the user device and to transmit the video data directly to the user device. The user device transmits the request using code of the Web page. Further to these embodiments, the user device may transmit the request and authorization data to the server, and the server may validates the authorization data, transmit a token to the user device, and transmit the token to the remote video source. The remote video source may receive the request for video data and a request token from the user device, determine if the request token is associated with the token received from the server, and transmit the video data directly to the user device only if the request token is associated with the token received from the server.

The claimed invention is not limited to the disclosed embodiments, however, as those in the art can readily adapt the description herein to create other embodiments and applications.

BRIEF DESCRIPTION OF THE DRAWINGS

The construction and usage of embodiments will become readily apparent from consideration of the following specification as illustrated in the accompanying drawings, in which like reference numerals designate like parts, and wherein:

FIG. 5 is a tabular representation of a portion of a password database according to some embodiments;

FIG. 6 is a tabular representation of a portion of a meeting database according to some embodiments;

FIG. 8 is a tabular representation of a portion of a camera/site parameters database according to some embodiments;

FIG. 27 is an outward view of a user interface according to some embodiments;

DETAILED DESCRIPTION

System Architecture

Figure 1:
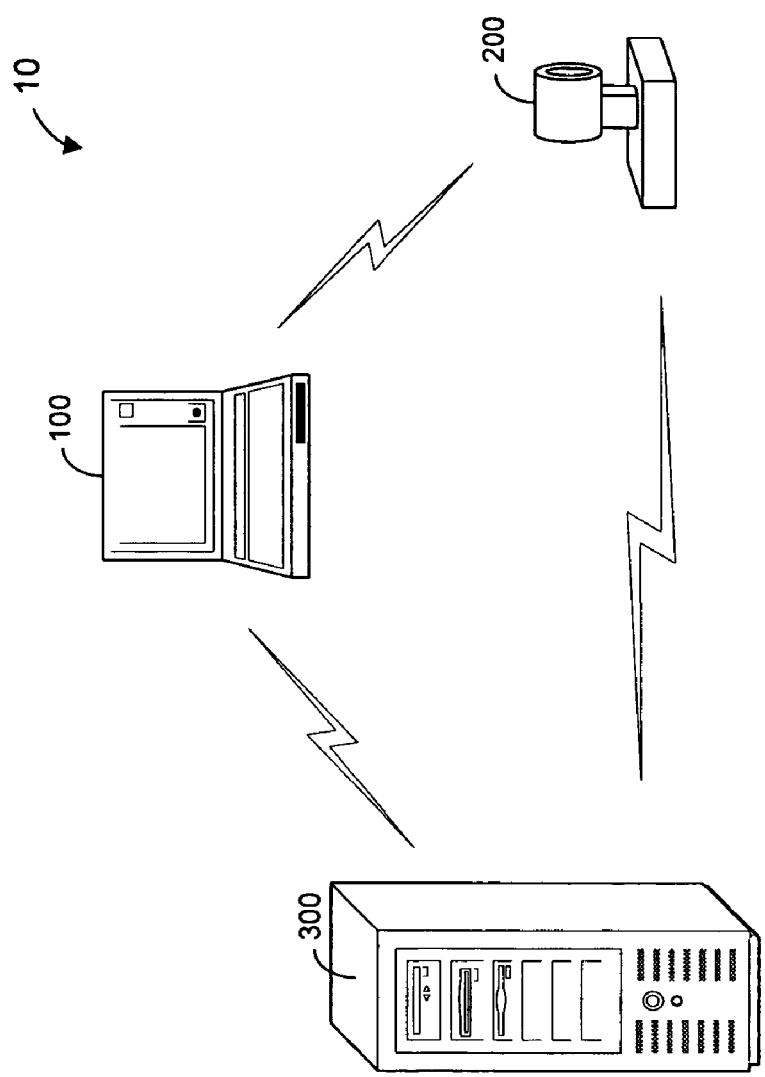
FIG. 1 is a diagram of a system architecture according to some embodiments.

FIG. 1 illustrates an architecture of system 10 according to some embodiments. User device 100, video source 200 and server 300 are located remote from one another and are in communication with one another. It should be noted that although devices may be illustrated and referred to herein as "in communication" with one another, such devices need not be constantly exchanging data. Rather, "in communication" may refer to a configuration having any degree of interconnection or data transfer. Communication between two devices "in communication" with one another may be established when necessary and severed at other times or always available but rarely used to transmit data. Moreover, although some illustrated communication links appear dedicated, it should be noted that each illustrated link may be shared by other devices.

Briefly, according to some embodiments, user device 100 transmits a Web page request to server 300, server 300 transmits a Web page to user device 100 in response to the request, and video source 200 receives a request for video data from user device 100 and transmits the video data directly to user device 100. User device 100 transmits the request using code of the received Web page. Some embodiments of the foregoing may provide more desirable video meeting functionality than previously available. Specific details of some embodiments will be described in detail below.

User device 100 comprises a notebook computer. User device 100 may comprise any device capable of executing a Web browser and connecting to the World Wide Web. The World Wide Web is a computer network of Internet servers that support Hypertext Transfer Protocol (HTTP). The term "Web" as used herein encompasses the foregoing definition as well as any other currently- or hereafter-known networks that support the transfer of information similar to Web pages.

Non-exhaustive examples of user device 100 include a standalone personal computer, a networked personal computer located behind a firewall, a personal digital assistant, and a cellular telephone. In some embodiments, user device 100 transmits a Web page request, receives a Web page from server 300 in response to the request, transmits a request for video data to video source 200 using code embedded in the Web page, and receives the video data directly from video source 200. User device 100 may display the video data in a frame of the Web page. A more detailed description of the architecture and operation of user device 100 according to some embodiments is set forth below.

Video source 200 comprises a video camera. According to some embodiments, video source 200 comprises the Axis 2130 PTZ network camera, which includes a Web server. Video source 200 may provide an application programming interface that may be used by external devices to control its elements. Video source 200 may comprise any other video source capable of the functionality that is required by the embodiments in which it is employed. According to some embodiments, video source 200 may comprise any device or devices capable of responding to requests from a Web browser and outputting a video stream. Video source 200 may comprise an analog or digital video recorder coupled to an embedded or external Web server.

Server 300 may comprise a conventionally-equipped Linux server, or any other cuurently- or hereafter-known device capable of the functions required thereof. An architecture of server 300 according to some embodiments will be described below with respect to FIG. 4. Server 300 may receive a Web page request and transmit a Web page to user device 100 in response to the request. The Web page may include code usable by a Web browser of user device 100 to transmit a request for video data to video source 200 and to receive the video data directly from video source 200. According to some embodiments, server 300 generates a token, transmits the token to user device 100 along with the Web page, and transmits the token to video source 200. Video source 200 then transmits the video data directly to user device 100 if the token it received from server 300 is associated with a token that it received from user device 100 along with the request for video data.

Devices 100 through 300 may communicate over any number of different systems for transferring data, including but not limited to a local area network, a wide area network, a telephone network, a cellular network, a fiber-optic network, a satellite network, an infra-red network, a radio frequency network, and any other type of network which may be used to transmit information between devices. Moreover, communication between devices 100 through 300 may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP). In some embodiments, all data is transmitted over the World Wide Web.

User Device

Figure 2:
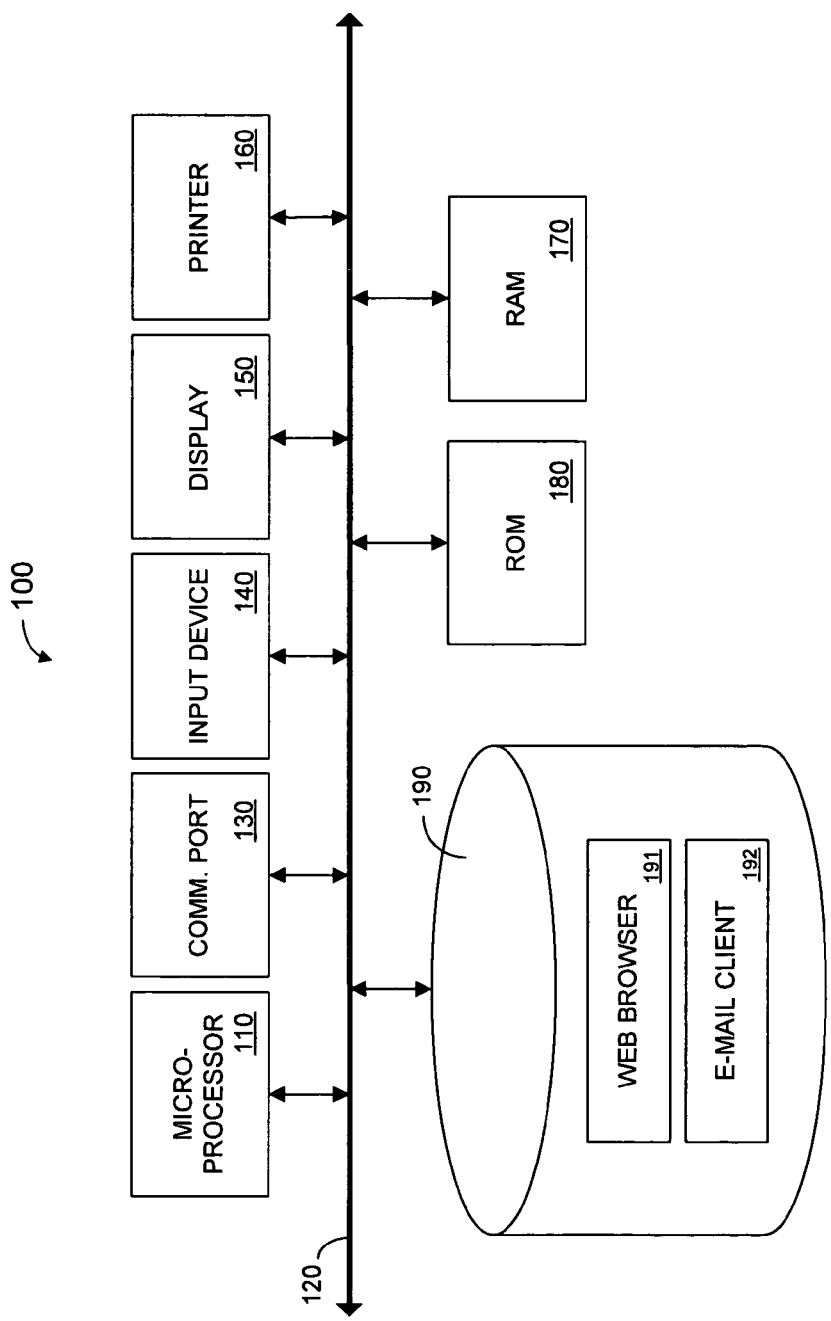
FIG. 2 is a block diagram illustrating an internal architecture of a user device according to some embodiments.

FIG. 2 illustrates several elements of user device 100 according to some embodiments. Initially, microprocessor 110 is shown in communication with communication bus 120. Microprocessor 110 may comprise a Pentium™ or other type of processors capable of executing processor-executable process steps so as to control the elements of user device 100 to provide desired functionality.

Also in communication with communication bus 120 is communication port 130. Communication port 130 may be used to transmit data to and receive data from external devices such as video source 200 and server 300. Communication port 130 is therefore preferably configured with hardware suitable to physically interface with desired external devices and/or network connections. For example, communication port 130 may comprise an Ethernet connection to a local area network through which user device 100 may receive and transmit information over the Web.

Input device 140, display 150 and printer 160 are also in communication with communication bus 120. Any known input device may comprise input device 140, including a keyboard, mouse, touch pad, voice-recognition system, or any combination of these devices. Of course, information may also be input to user device 100 from other devices via communication port 130. Display 150 may be an integral or separate CRT display, flat-panel display, projection screen or the like used to display graphics and text such as Web pages and video data in response to commands issued by microprocessor 110. Printer 160 may also present text and graphics, but in hardcopy form using ink-jet, thermal, dot-matrix, laser, or other printing technologies. Input device 340, display 350 and printer 360 may also be used in conjunction with other applications provided by user device 300 which are unrelated to the present invention.

RAM 170 is connected to communication bus 120 to provide microprocessor 110 with fast data storage and retrieval. In this regard, processor-executable process steps being executed by microprocessor 110 are typically stored temporarily in RAM 170 and executed therefrom by microprocessor 110. ROM 180, in contrast, provides storage from which data can be retrieved but to which data cannot be stored. Accordingly, ROM 180 is used to store invariant process steps and other data, such as basic input/output instructions and data used during boot-up of user device 100 or to control communication port 130. It should be noted that one or both of RAM 170 and ROM 180 may communicate directly with microprocessor 110 instead of over communication bus 120.

Storage device 190 may comprise a fixed disk drive or other persistent storage medium. Storage device 190 stores, among other data, processor-executable process steps of Web browser 191. The process steps may be executed by microprocessor 110 to provide communication with remote Web servers such as those that might be integrated with video source 200 and server 300. In some embodiments, steps of Web browser 191 may be executed to transmit a Web page request, receive a Web page from server 300 in response to the request, transmit a request for video data to video source 200 using code embedded in the Web page, and receive the video data directly from video source 200. The steps may be further executed to display the video data in a frame of the received Web page.

Processor-executable process steps of e-mail client 192 are also stored in storage device 190. The process steps of e-mail client 192 may be executed to receive e-mail that is transmitted to a user of user device 100 by server 300. As will be described below, such an e-mail may provide information regarding a video meeting in which the user is scheduled to participate, including authorization data, time, date, location, etc.

Storage device 190 may store one or more of other applications, data files, device drivers and operating system files needed to provide functions other than those directly related to the present invention. Such functions may include calendaring, word processing, accounting, presentation development and the like.

Video Source

Figure 3:
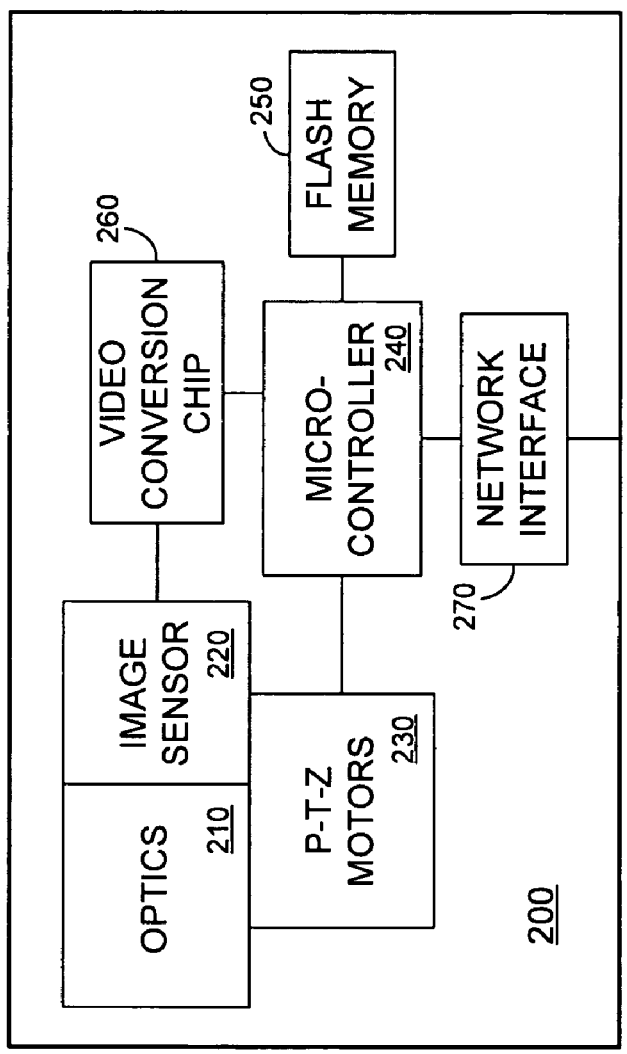
FIG. 3 is a block diagram illustrating an internal architecture of a video source according to some embodiments.

FIG. 3 is a block diagram of the internal architecture of video source 200 according to some embodiments. As shown, video source 200 includes optics 210 and image sensor 220, which function cooperatively to capture an image. Optics 210 may comprise any combination of one or more lenses and other elements, while image sensor 220 may comprise any type of image sensing device, including but not limited to CCD-based and CMOS-based devices.

Pan-Tilt-Zoom motors 230 are capable of moving optics 210 to change a field of view and changing a focus of optics 210. The field of view and focus of video source 200 are fixed in some embodiments that do not include motors 230. Motors 230 may be controlled by commands received from microcontroller 240. In this regard, microcontroller 240 may execute processor-executable process steps stored in flash memory 250 to issue commands to motors 230. Flash memory 240 may also comprise operating system files for controlling basic processes of video source 200.

Flash memory 250 may store processor-executable process steps of a Web server as well as processor-executable process steps to handle requests received from user device 100 and server 300 via the Web server. According to some embodiments, these latter process steps comprise CGI scripts that are executed based on information included in HTTP-based communications that are received from user device 100 and server 300.

Flash memory 240 may also store processor-executable process steps to support an application programming interface of video source 200. The application programming interface may facilitate the control of video source 200 by external devices. Other data that may be stored in flash memory 240 include a table of tokens received from server 300 as will be described below and a table of preset pan, tilt and zoom coordinates.

Video conversion chip 260 receives video data from image sensor 220 and converts the video data into a form usable by microcontroller 240. According to some embodiments, chip 260 receives NTSC-formatted data from image sensor 220 and outputs MJPEG data to microcontroller 240. Such conversion is performed by microcontroller 240 according to some embodiments.

Microcontroller 240 outputs the video data via network interface 270. Incoming HTTP requests are also received by network interface 270, which may comprise an Ethernet connection.

Server

Figure 4:
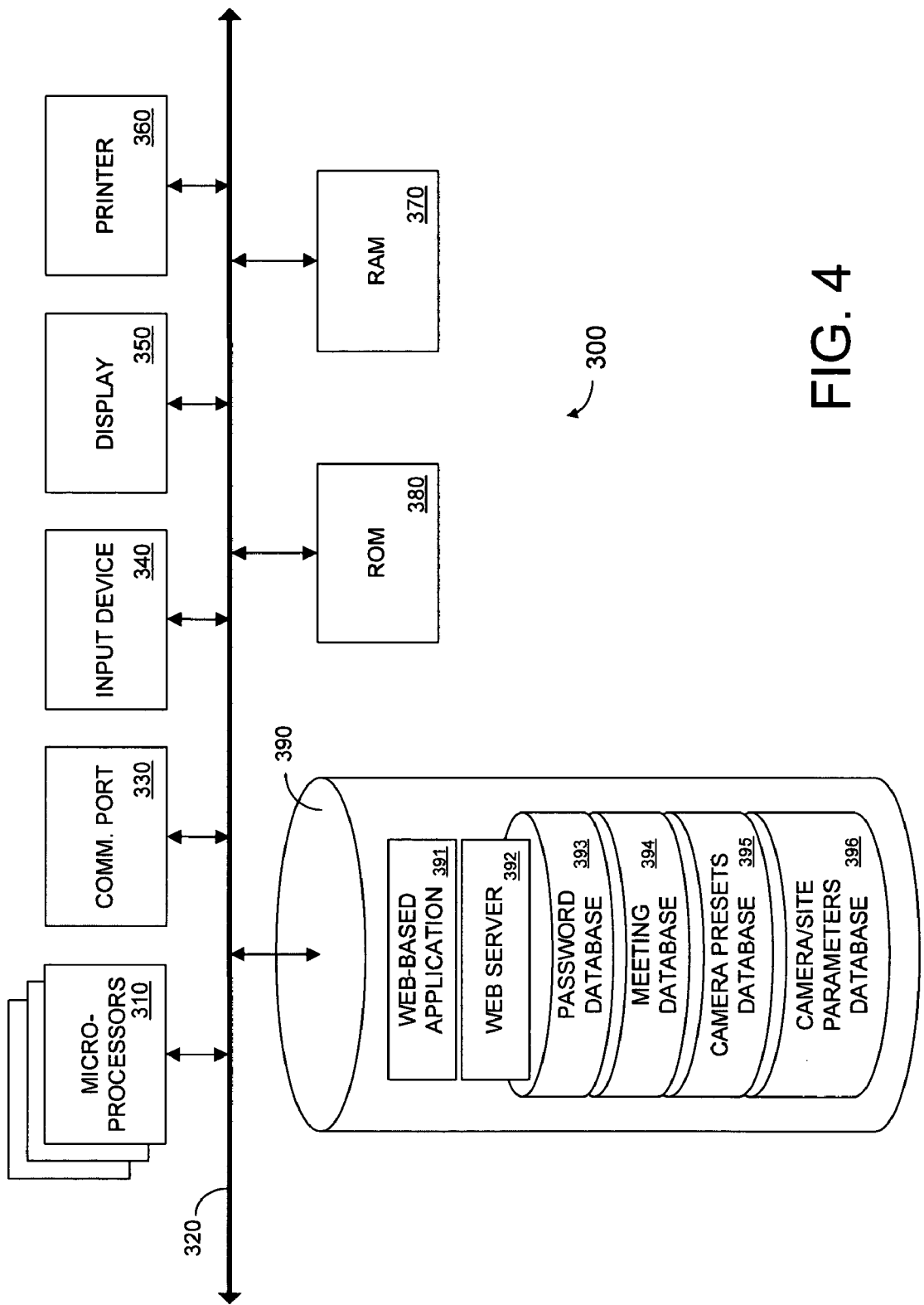
FIG. 4 is a block diagram illustrating an internal architecture of a server according to some embodiments.

FIG. 4 is a block diagram of an internal architecture of server 300 according to some embodiments. The illustrated elements of server 300 may comprise any of the specific examples offered with respect to identically-named elements of user device 100. Of course, specific functions performed by the elements may differ from the functions performed by the identically-named elements.

For example, communication port 330 may be used to receive requests for Web pages and authorization data from user device 100, and to transmit Web pages to user device 100 and tokens to video source 200. Input device 340, display 350 and printer 360 may be used to perform maintenance tasks and installation procedures, but may also be used in conjunction with a Web browser (not shown) so that server 300 also performs functions of a user device according to some embodiments.

Storage device 390 stores, among other data, processor-executable process steps of Web-based application 391. Microprocessors 310 therefore execute the process steps of Web-based application 391 in order to control server 300 to control a browser-based meeting according to some embodiments. Web-based application 391 may comprise CGI scripts that are executed in response to CGI data that are received from remote Web browsers over the Web. Such CGI data may be embedded within a request for a Web page that is received by server 300.

Upon receiving such CGI data, Web-based application 391 may create an HTML-based Web page and transmit the Web page to the requesting device. As will be described below, the Web page may include a frame in which video data is to be presented. Web-based application may comprise any type of application that may be responsive to HTTP requests, including but not limited to Java™-based applications.

The process steps of Web-based application 391 may be read from a computer-readable medium, such as a floppy disk, a CD-ROM, a DVD-ROM, a Zip™ disk, a magnetic tape, or a signal encoding the process steps, and then stored in storage device 390 in a compressed, uncompiled and/or encrypted format. In alternative embodiments, hard-wired circuitry may be used in place of, or in combination with, processor-executable process steps for implementation of processes according to embodiments. Thus, embodiments are not limited to any specific combination of hardware and software.

Process steps of Web server 392 are also stored in storage device 390. These process steps may be executed by microprocessors 310 to transmit data to and to receive data from Web clients, such as Web browsers, over the Web using HTTP and/or HTTPS protocol. The transmitted data may comprise Web pages received from application 391, and the received data may be passed to application 391 for further processing.

Password database 393 of storage device 390 includes authorization information associated with various meeting sites. Meeting database 394 includes details of meetings that have been scheduled using server 300. Camera presets database 395 specifies preset pan, tilt and zoom coordinates for various cameras managed by server 300, and camera/site parameters database 396 specifies parameters used during operation of system 10. Much of the data within databases 393 through 396 may be modified using a browser-based interface provided by Web-based application 391 according to some embodiments, thereby facilitating management of system 10.

Also stored in storage device 390 may be other unshown elements that may be necessary for operation of server 300, such as an operating system, a database management system, other applications, other data files, and "device drivers" for allowing microprocessors 310 to interface with devices in communication with communication port 330. These elements are known to those skilled in the art, and are therefore not described in detail herein.

Databases

Figure 30:
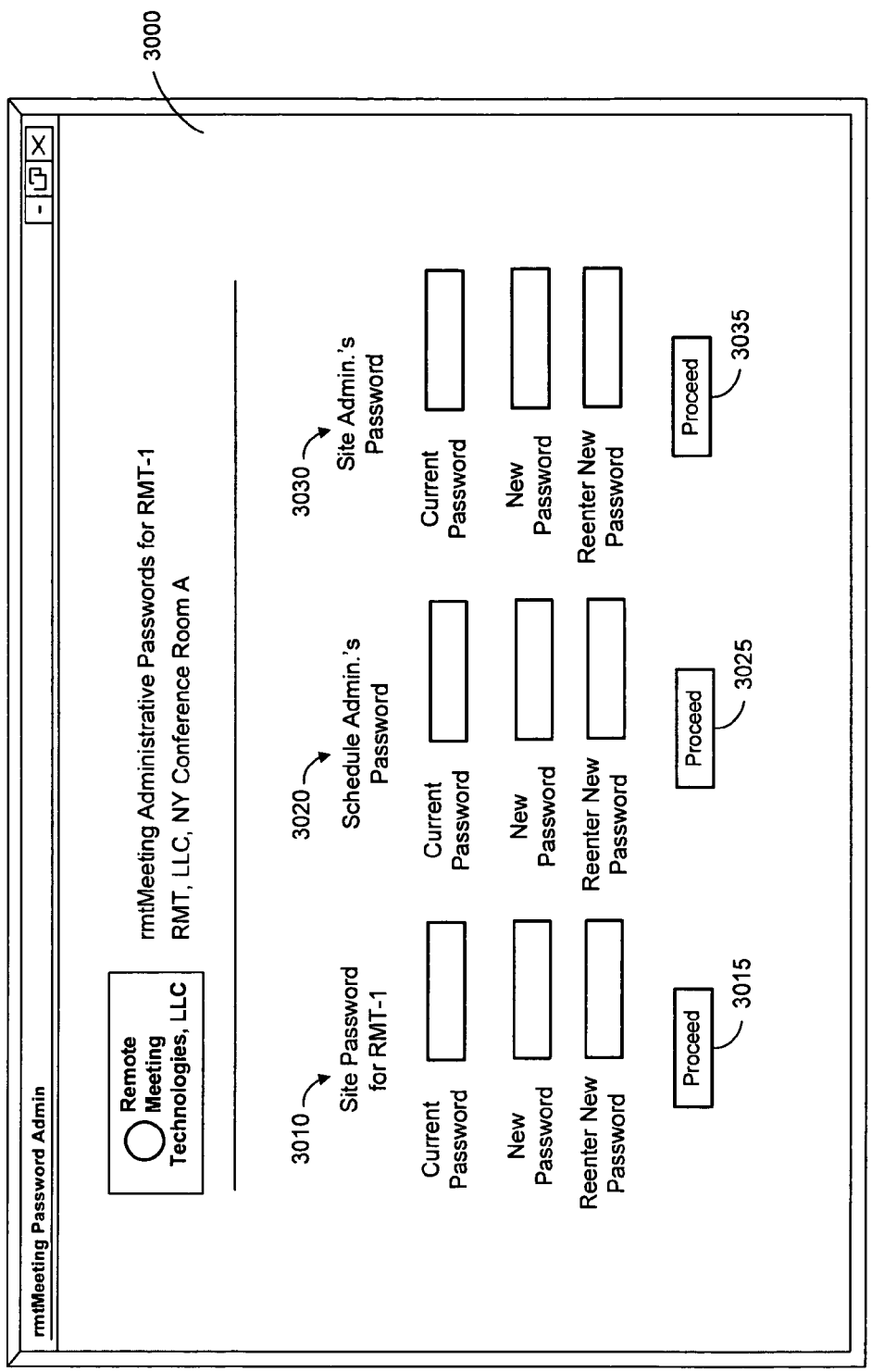
FIG. 30 is an outward view of a user interface according to some embodiments.
Figure 31:
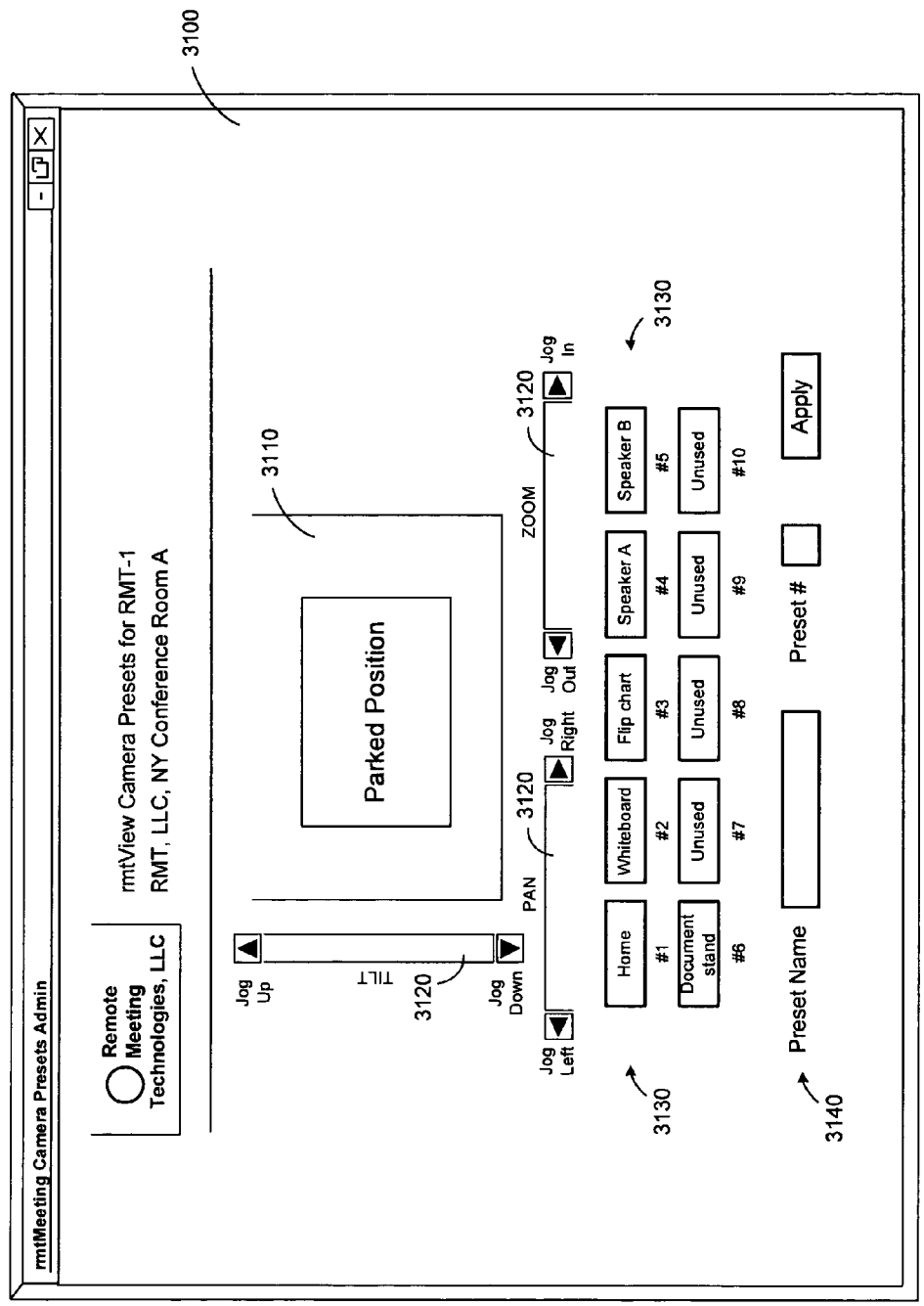
FIG. 31 is an outward view of a user interface according to some embodiments.

A tabular representation of a portion of password database 393 is shown in FIG. 5. As described above, password database 393 may include authorization information used to grant and deny access to server 300. Password database 393 includes several records and associated fields. The fields include Site Id, Password, Schedule Administration/Username, Schedule Administration/Password, Site Administration/Username, and Site Administration/Password. The data of each field may be supplied by a user through a browser-based interface that will be described with respect to FIG. 30.

FIG. 6 illustrates tabular representations of several portions of meeting database 394. Each portion is associated with a meeting that is specified in its respective header field. Each portion includes a plurality of records, each including a number of fields. The fields include Username, Password, Guest/Host, Moderator, Email Address, Name and Location. Accordingly, each record is associated with a participant that is scheduled to participate in the meeting specified in the header. Use of these fields will be described with respect to FIG. 9, and population thereof will be described below with respect to FIGS. 26 and 27.

Figure 7:
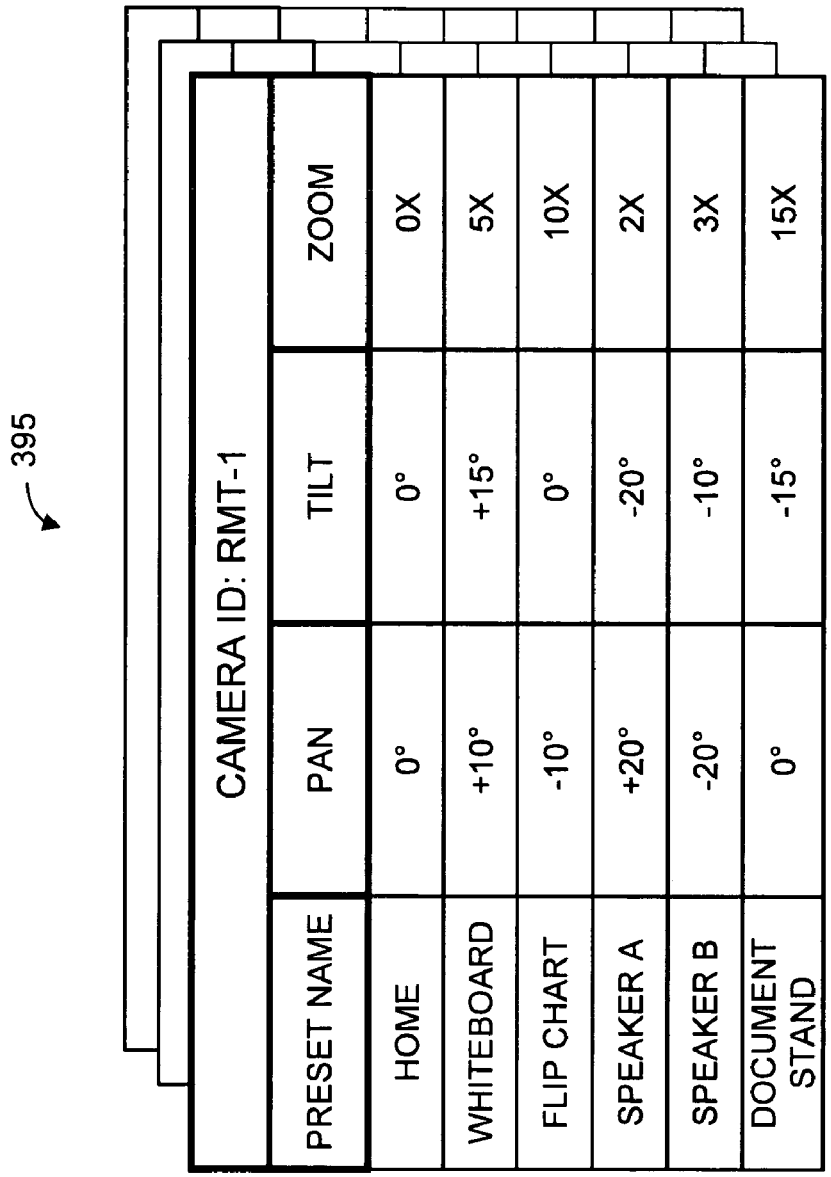
FIG. 7 is a tabular representation of a portion of a camera presets database according to some embodiments.

Tabular representations of several portions of camera presets database 395 are illustrated in FIG. 7. Each portion is associated with one camera managed by server 300. Camera presets database 395 specifies preset pan, tilt and zoom coordinates for each camera. Accordingly, the fields of camera presets database 395 as shown in FIG. 7 include Preset Name, Pan, Tilt, and Zoom. The information of camera presets database 395 may be used to generate a Web page including preset buttons and to control video source 200 in accordance with a selected preset button.

FIG. 8 illustrates a tabular representation of a portion of camera/site parameters database 396. Each record of camera/site parameters database 396 stores information regarding a camera and a site at which the camera is located. The fields of each record include Camera ID, Location Name, Time Zone, Picture Parameters, Network Parameters, and Camera State. Use of the information stored in repayment camera/site parameters database 396 will be described with reference to the flow diagrams herein.

It should be noted that the tabular illustrations and accompanying descriptions of databases 393 through 396 merely represent relationships between stored information. A number of other arrangements for associating data may be employed besides those suggested, including arrangements in which some or all of the data is located remote from server 300. It is further contemplated that each of databases 393 through 396 may include many more records than those shown and that each record may include associated fields other than those illustrated.

Processes

Figure 9:
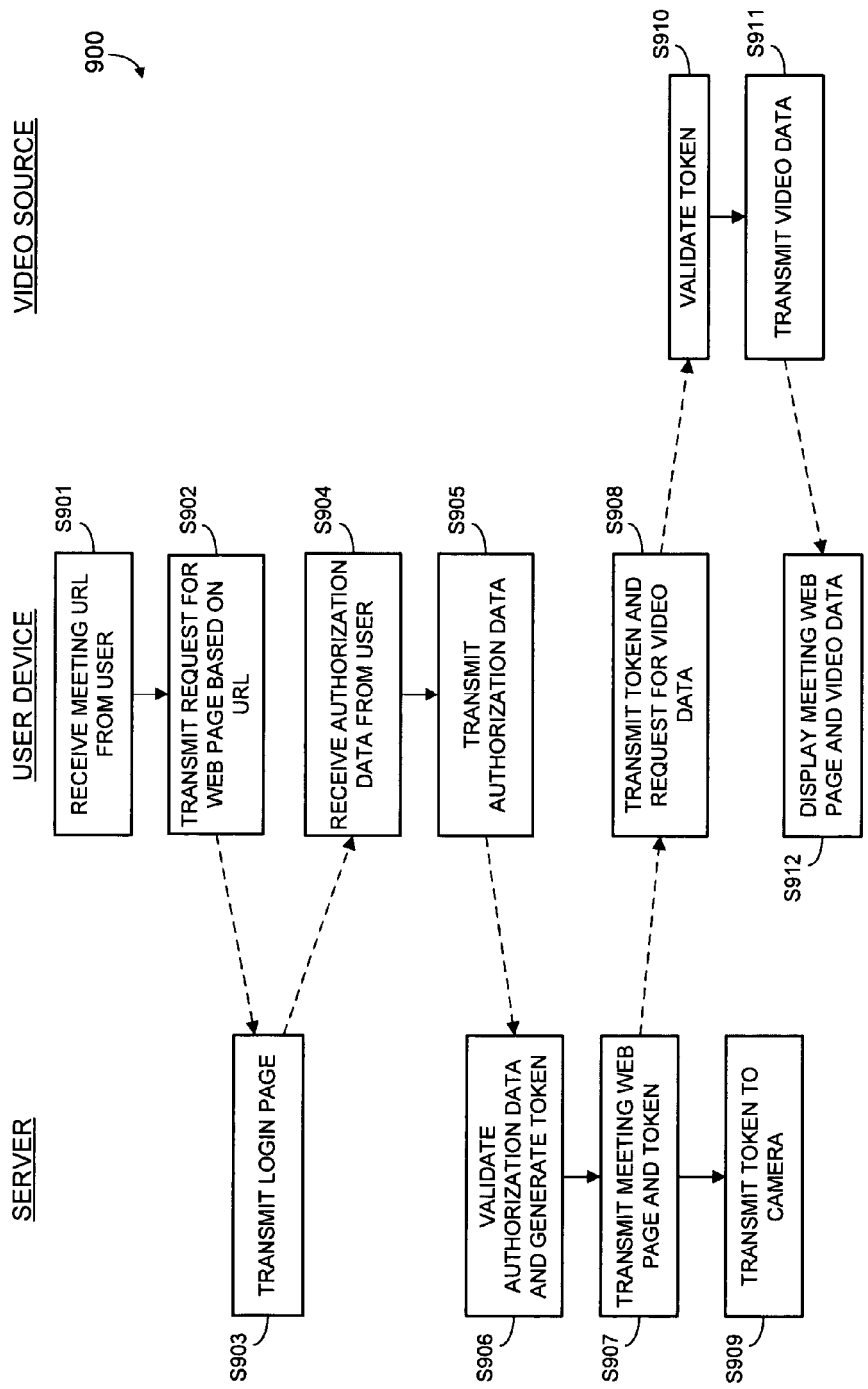
FIG. 9 is a flow diagram of process steps according to some embodiments.

FIG. 9 comprises a flow diagram of process steps 900 according to some embodiments. Process steps 900 are described below as if embodied in server 300, user device 100 and video source 200. More particularly, in the case of each flow diagram provided herein, steps attributed to server 300 may be embodied in Web-based application 391 and Web server 392, steps attributed to user device 100 may be embodied in Web browser 191, and steps attributed to video source 200 may be embodied in CGI scripts stored in flash memory 250. Process steps of each flow diagram may be embodied in one or more software or hardware elements and executed, in whole or in part, by any device or by any number of devices in combination. Moreover, some or all process steps may be performed manually.

Initially, at step S901, a user device receives a meeting URL from a user. For purposes of the present example, it will be assumed that a user operates user device 100 to execute Web browser 191 at step S901. The user then manipulates input device 140 to input a URL into an address bar of an interface displayed by Web browser 191.

User device 100 transmits a request for a Web page based on the URL at step S901. The request is transmitted over the Web via communication port 130, and known mechanisms of the Web operate to direct the request to a server hosting the Web page to which the URL points. It will be assumed that Web server 292 is hosting the Web page, therefore the request is received by server 300.

Figure 10:
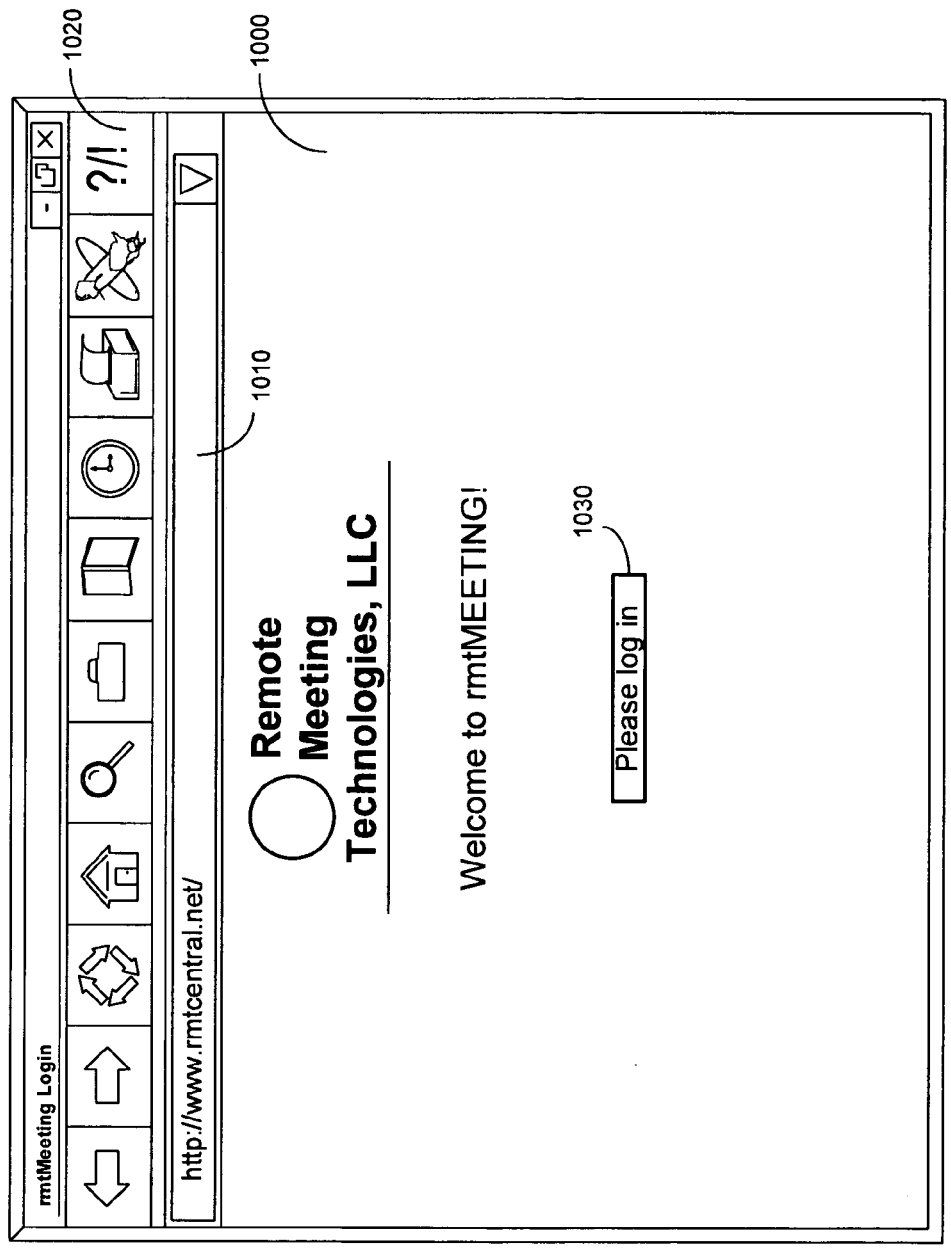
FIG. 10 is an outward view of a user interface according to some embodiments.

In response to the request, server 300 transmits a "login" Web page to the requesting Web browser at step S903. The Web page is then received by user device 100 and displayed by Web browser 191. FIG. 10 is an outward view of login page 1000 as received by user device 100 and displayed by display 150 according to some embodiments. The meeting URL is shown in address bar 1010 of browser window 1020.

According to some embodiments, the user selects login control 1030 after step S903. Web page 1000 includes code that associates login control 1030 with a second URL and a command to open a new browser window. Upon user selection of control 1030, a new browser window is opened, a request for a Web page is sent to the second URL (which also may be hosted at server 300), and server 300 transmits a Web page to the new browser window.

Figure 11:
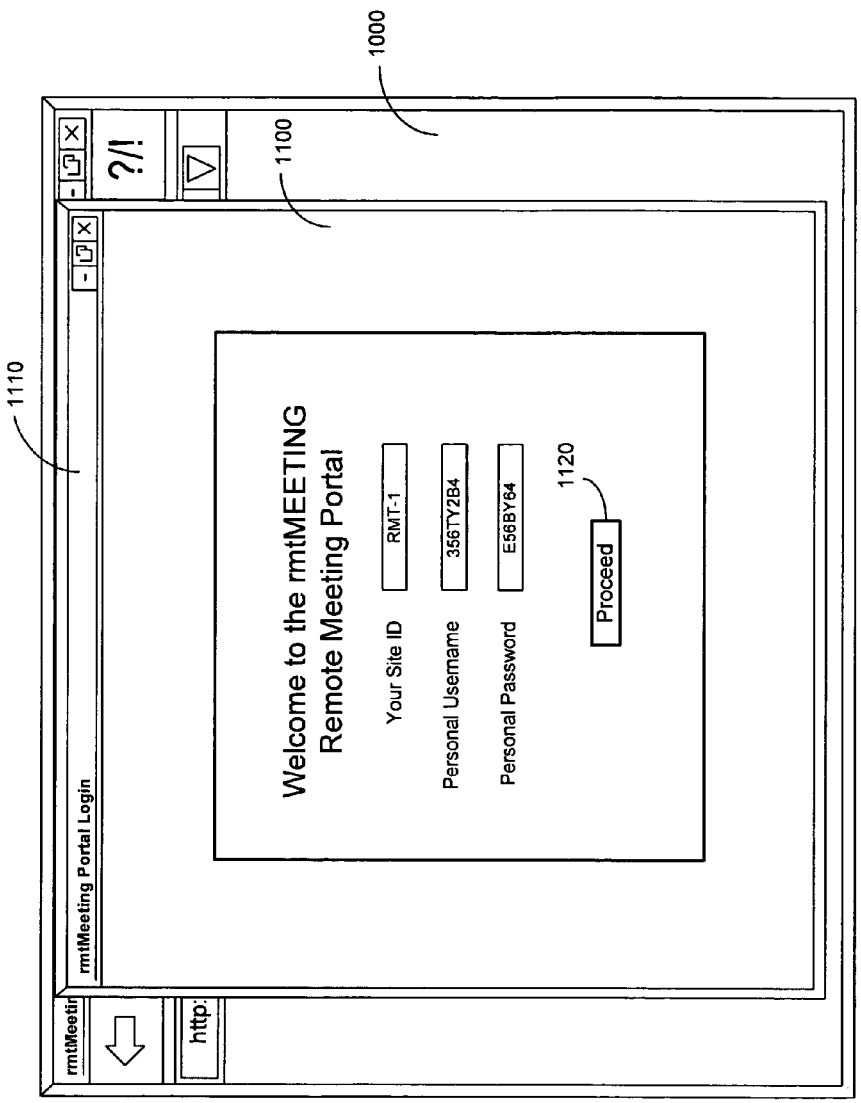
FIG. 11 is an outward view of a user interface according to some embodiments.

FIG. 11 shows Web page 1100 as displayed in new browser window 1110. Web page 1100 includes fields for entering authorization information. As will be described below, a user may receive authorization information such as a username and password after a meeting is scheduled that includes the user as a participant. The user inputs the information into Web page 1100 and user device 100 receives the information at step S904. The user then selects "proceed" control 1120 to transmit the authorization information in step S905.

In some embodiments, "proceed" control 1120 is associated with a URL of server 300 within the code of Web page 1110. A request for a Web page is therefore issued by Web browser 191 when "proceed" control 120 is selected. The authorization data is transmitted to server 300 along with the request using known protocols.

Server 300 validates the authorization data and generates a token at step S906. The authorization may be validated by determining if the site ID, username and password included in the authorization data correspond to a user that is associated with a currently active meeting described in meeting database 394. It will be assumed that the transmitted site ID, username and password are RMT-1, B5TV32VQ and B46YB, and that it is Jul. 18, 2004, 9:05 am. The token may be randomly generated.

Server 300 then transmits a meeting Web page and a token to user device S907. User device 100, in turn, transmits the token and a request for video data to video source 200 at step S908. The token and a URL for requesting the video data may be embedded in the meeting Web page received by user device 100. While processing the meeting Web page, code of the Web page instructs Web browser 191 to request data from and to pass the token to the particular URL. Meanwhile, server 300 also transmits the token to video source 200 at step S909.

At step S910, video source 200 receives the request and compares the tokens received from user device 100 and server 300. The token received from user device 100 is validated if it is properly associated with the token received from server 300. According to the present embodiment, the tokens must be identical. Other embodiments of step S910 may require a different relationship between the tokens for validation thereof.

Video data is transmitted directly from video source 200 to user device 100 at step S911. The data captured by image sensor 270, converted by video conversion chip 260 into MJPEG format, encapsulated according to a network protocol by microcontroller 240, and transmitted by network interface 270. The network protocol may comprise a streaming protocol supported by Web browser 191.

Although the video data is described as being transmitted "directly" from video source 200 to user device 100, other devices may receive the data as it travels from video source 200 to user device 100. For example, the data may initially be received by an Internet Service Provider associated with video source 200 and may be transmitted therefrom over the World Wide Web. Video source 200 may be associated with one or more cascaded proxy servers, which receive the video data therefrom and deliver the video data to one or more user devices.

One packet of the video data may pass through a particular sequence of devices until it reaches user device 100, while another packet of the video data may pass through another sequence of devices until it reaches user device 100. The foregoing examples of direct transmission stand in contrast to video transmission offered by other Web-based secure videoconferencing systems, which require that the video data pass through a server or other device under the control of the system before the video data reaches an end user.

Figure 12:
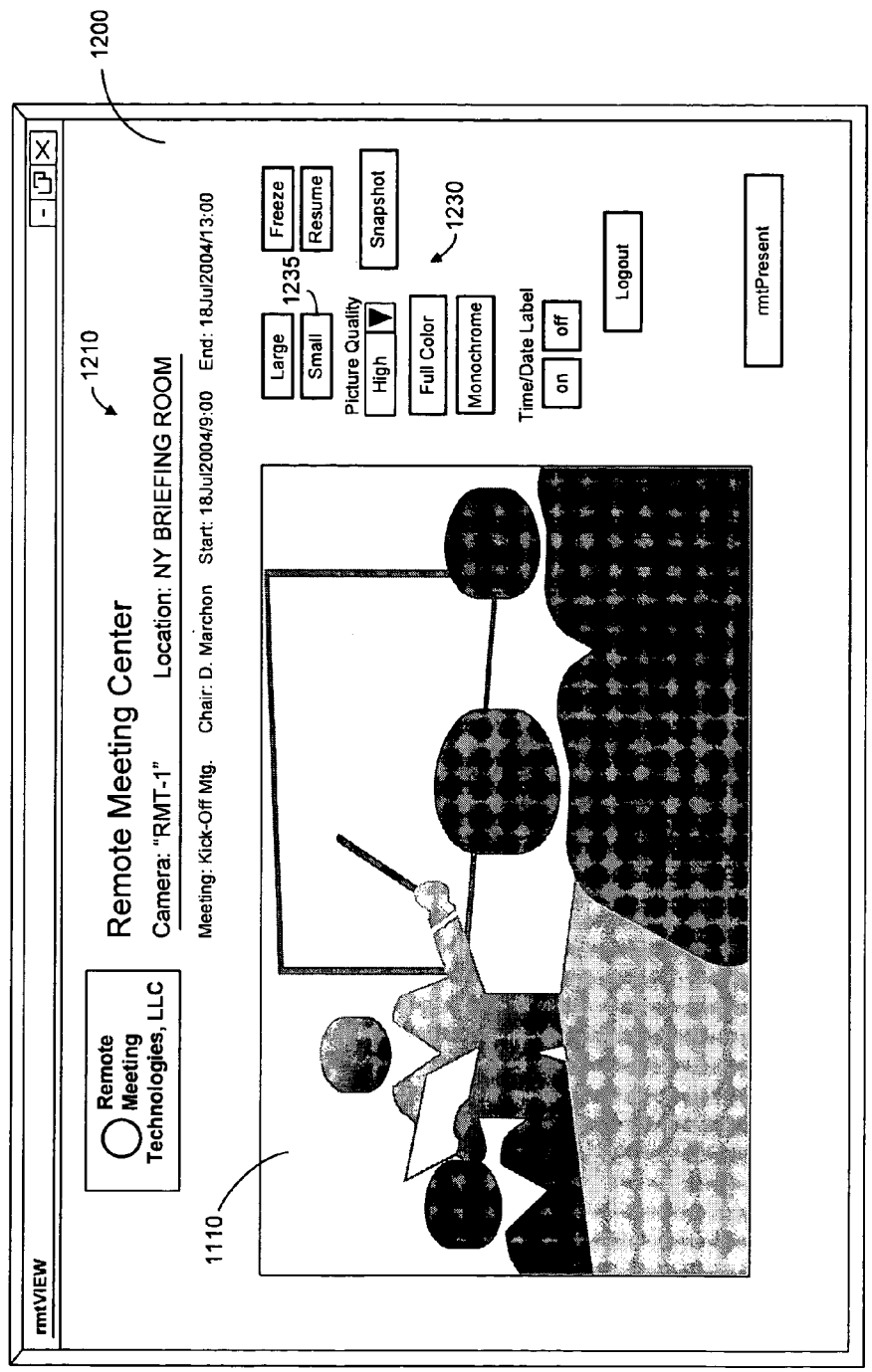
FIG. 12 is an outward view of a user interface according to some embodiments.

After receiving the video data, user device 100 displays the meeting Web page with the video data embedded therein at step S912. FIG. 12 is an outward view of meeting Web page 1200 as displayed by user device 100 according to some embodiments. As shown, meeting Web page 1200 was generated by server 300 at step S907 to include information 1210 from meeting database 394. Web page 1200 also includes frame 1220 in which the received video data is displayed.

Web page 1200 displays video format controls 1230. The user may control a format of the video data displayed in frame 1220 using video format controls 1230. All meeting participants are allowed to control a video format displayed by their respective Web browser according to some embodiments.

Figure 13:
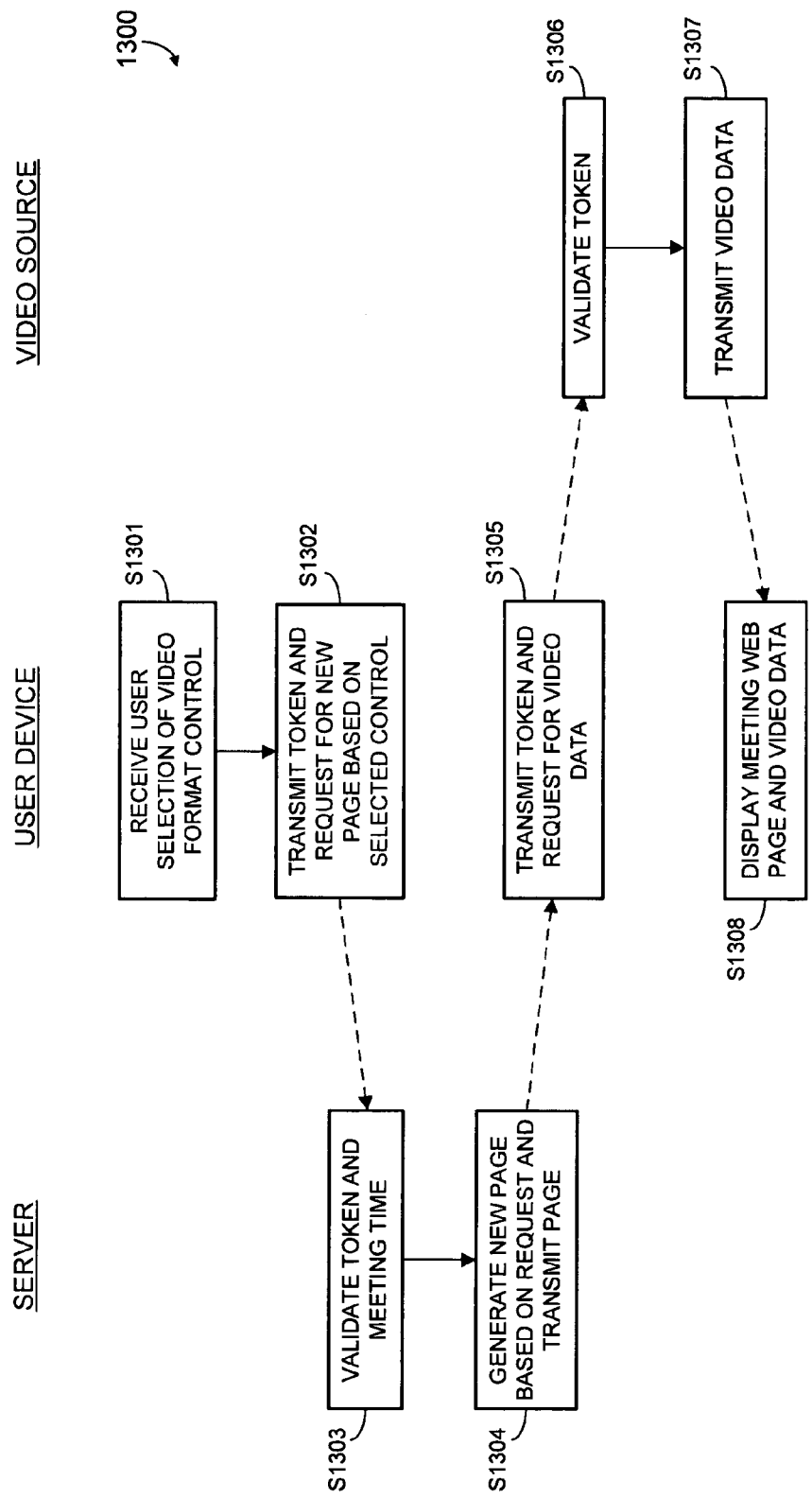
FIG. 13 is a flow diagram of process steps according to some embodiments.

FIG. 13 is a flow diagram of process steps 1300 to provide the above-mentioned video format control. Initially, at step S1301, user device 100 receives a user selection of a displayed video format control. User device 100 then transmits a request for a new Web page to server 300 at step S1302 based on the selected video format control.

Each displayed video format control may be associated with code of Web page 1200 that specifies a unique URL. For example, each video format control may be associated with a URL of Web server 392 and with CGI data specific to the video format control. Accordingly, the request is transmitted at step S1302 to the URL and with the CGI data associated with the selected control. The token that was transmitted to user device 100 at step S907 of process steps 900 may also be transmitted to server 300 at step S1302.

Server 300 validates the token and the meeting time at step S1303. Step S1303 may comprise determining if the current time is within the scheduled start time and end time of the current meeting. In this regard, the site ID, username and password may also be received from user device 100 at step S1303 in order to identify the meeting and user that are associated with the received request. The token received from user device 100 is validated if it is properly associated with the token transmitted by server 300 at step S907. Again, the tokens may be required to be identical or a different relationship between the tokens may be required.

Server 300 generates and transmits a new Web page at step S1304 based on the request. According to some embodiments, CGI scripts of Web-based application 391 are executed based on CGI data that was received with the request. Execution of the CGI scripts may create an HTML page that conforms to the selected video format control. For example, it will be assumed that "small" control 1235 was selected at step S1301 and therefore the generated Web page includes a frame for displaying the video data that is smaller than frame 1220 of Web page 1200.

Upon receiving the new Web page, user device 100 transmits the token and a request for video data to video source 200 at step S1305. The token and a URL for requesting the video data may be embedded in the new Web page. Web browser 191 may be instructed by code of the new Web page to request data from and to pass the token to the particular URL.

Video source 200 receives the request at step S1306 and validates the received token as described above with respect to step S910 of process steps 900. Next, the video data is transmitted directly from video source 200 to user device 100 at step S1307. User device 100 then displays the new Web page with the video data embedded therein at step S1308.

Figure 14:
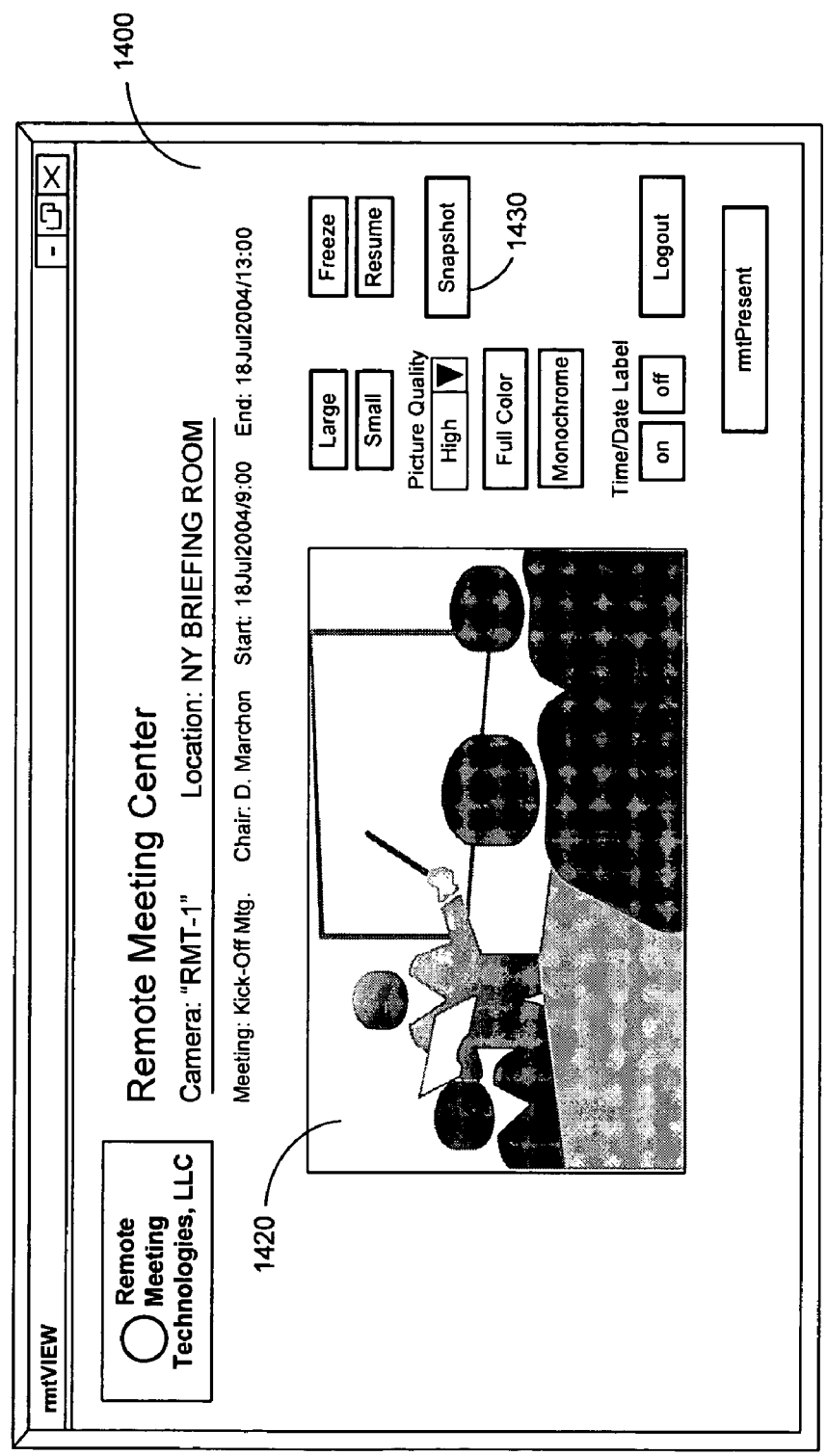
FIG. 14 is an outward view of a user interface according to some embodiments.

FIG. 14 is an outward view of Web page 1400 as displayed by user device 100 according to the present example. As shown, Web page 1400 is identical to Web page 1200, except that frame 1420 is smaller than frame 1220.

Figure 15:
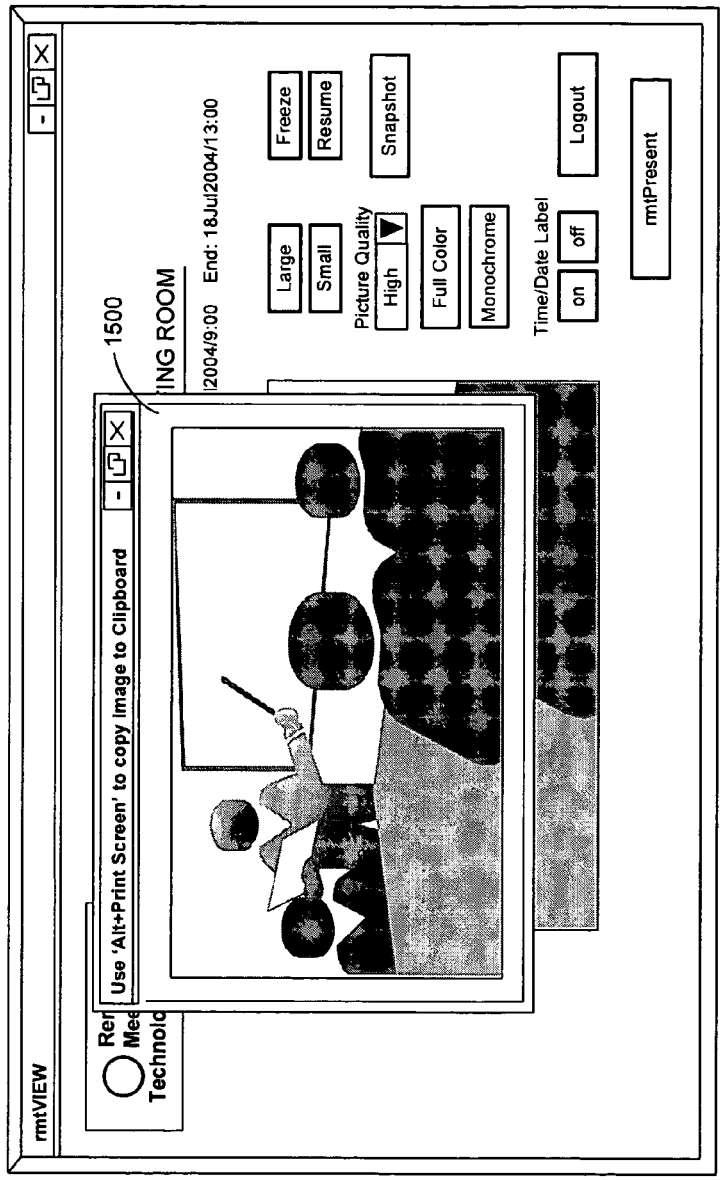
FIG. 15 is an outward view of a user interface according to some embodiments.

Web page 1400 displays "snapshot" control 1430. Upon receiving a user selection of control 1430, Web browser 191 opens a new window as illustrated by window 1500 of FIG. 15. Window 1500 includes a still image that was displayed by frame 1420 at the time that control 1430 was selected. As shown in FIG. 15, the user may copy the still image to a clipboard application of user device 100 by executing a particular keystroke.

Returning briefly to the foregoing example of process steps 900, it is noted that the site ID, username and password transmitted at step S905 were RMT-1, B5TV32VQ and B46YB, respectively. This authorization information is associated with a meeting participant that is identified as a "Guest" in meeting database 394 of FIG. 6. Accordingly, meeting Web page 1200, which was generated and transmitted by server 300 at step S907, is a meeting Web page intended for "Guest" participants.

Figure 16:
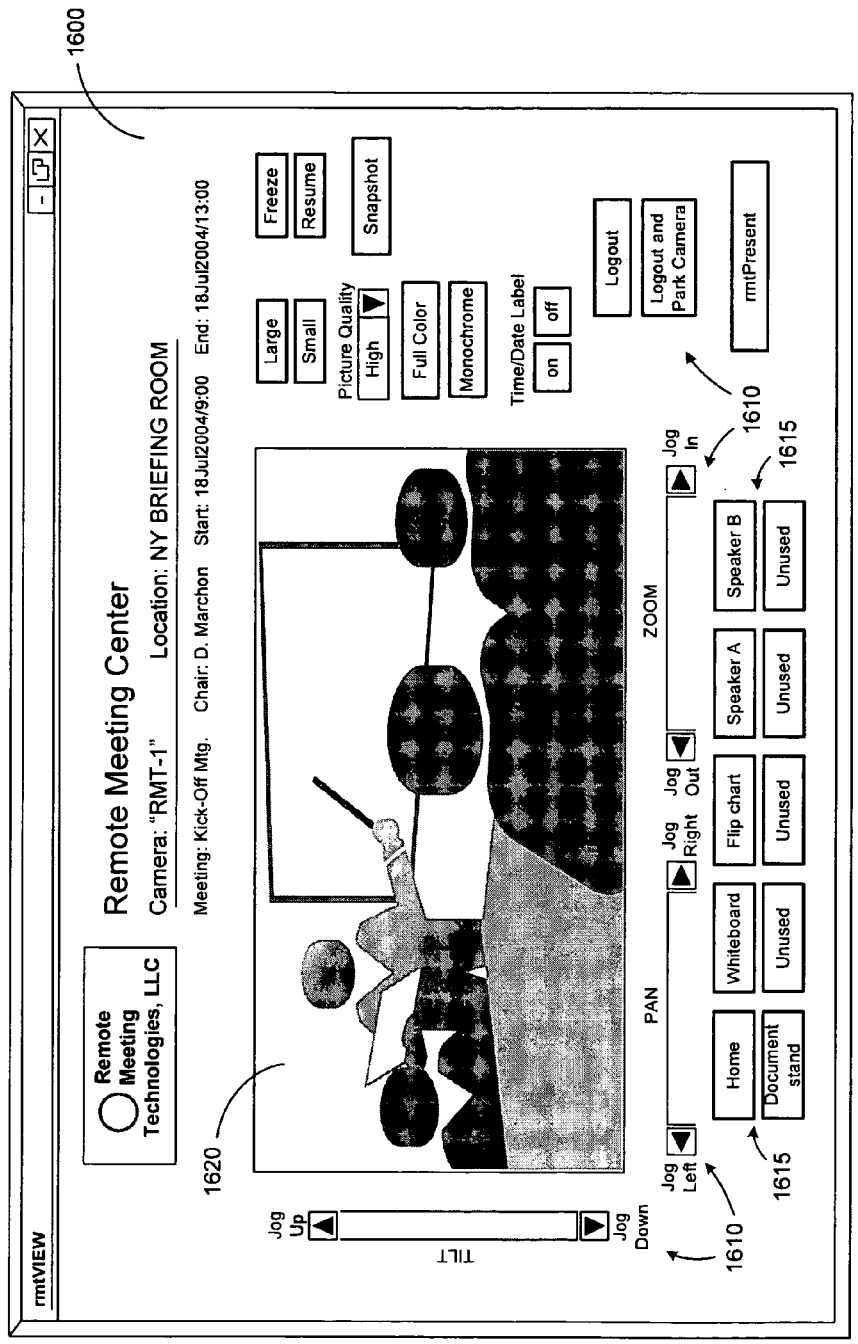
FIG. 16 is an outward view of a user interface according to some embodiments.

The authorization information transmitted at step S905 may be associated with a meeting participant that is identified as a "Host" in meeting database 394 of FIG. 6. In such a case, meeting Web page 1600 of FIG. 16 is generated by server 300 at step S907 and displayed by user device 100 at step S912. Meeting Web page 1600 includes all of the elements of Web page 1200, and also includes video source controls 1610. A user may manipulate video source controls 1610 to control video source 200. Such control may cause video source 200 to pan, tilt, and adjust its zoom setting.

Video source controls 1610 include preset buttons 1615, which may be selected to automatically adjust video source 200 to particular pan, tilt and zoom settings that are associated with each preset button. Server 300 may generate preset buttons 1615, as well as URLs and CGI data associated with preset buttons 1615, using information stored in camera presets database 395.

Figure 17:
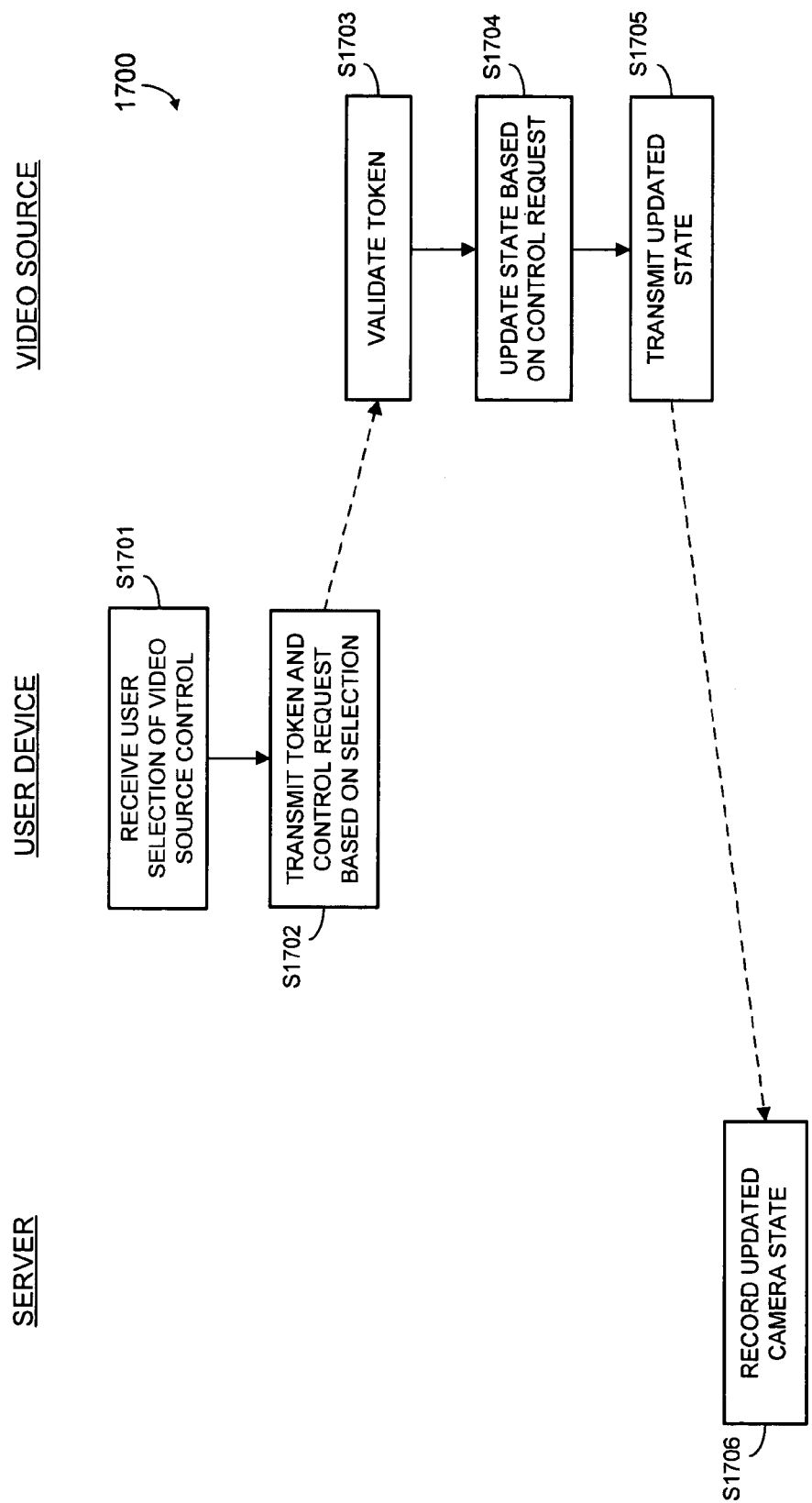
FIG. 17 is a flow diagram of process steps according to some embodiments.

FIG. 17 comprises a flow diagram of process steps 1700 to provide control over video source 200 via video source controls 1610. User device 100 initially receives a user selection of a displayed video source control at step S1701. Each one of video source controls 1610 may be associated with a URL of video source 200 and with CGI data specific to the video source control. As a result, user device transmits a control request to video source 200 at step S1702 along with CGI data associated with the selected control. The token that was transmitted to user device 100 at step S907 of process steps 900 may also be transmitted to video source 200 at step S1702.

Video source 200 receives the control request and the token at step S1703 and validates the token as described above with respect to step S910 of process steps 900. At step S1704, a state of video source 200 is updated based on the control request. For example, the user may have selected "Jog In" video source control 1610. CGI data associated with "Jog In" video source control 1610 is received by video source 200 at step S1703. The CGI data may comprise an instruction to increase a magnification of optics 210 by an incremental amount. Accordingly, at step S1704, an appropriate CGI script of flash memory 250 is executed to increase the magnification of optics 210. The CGI script may access an application programming interface provided by other code stored in flash memory 250. Such code may be provided by a manufacturer of video source 200.

In another example, a user selection of one of preset buttons 1615 is received at step S1701. CGI data associated with the selected preset button 1615 may specify a particular set of pan, tilt, and zoom settings, and is received by video source 200 at step S1703. An appropriate CGI script is then executed at step S1704 to conform video source 200 to the particular set of pan, tilt, and zoom settings. Again, the CGI script may access an application programming interface provided by a manufacturer of video source 200.

Figure 18:
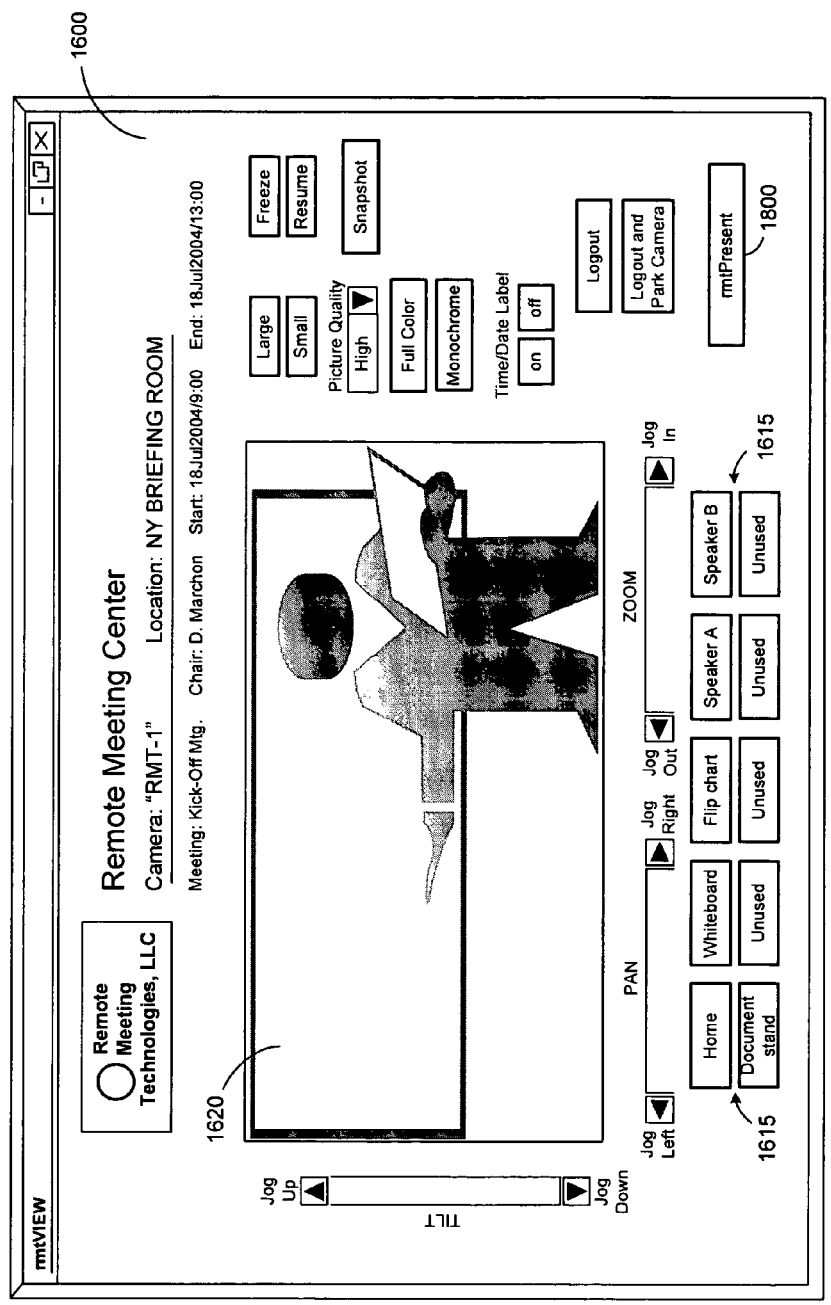
FIG. 18 is an outward view of a user interface according to some embodiments.

Video data continues to be transmitted to user device 100 during steps S1701 through S1704. Frame 1620 of Web page 1600 therefore displays video data captured by video source 200 as its state is changed. FIG. 18 illustrates an outward view of Web page 1600 after selection of "Whiteboard" preset button 1615. As shown, the video data displayed in frame 1620 evidences a different perspective than the video data shown in FIG. 16.

Video source 200 may transmit its updated state to server 300 at step S1705. Server 300 may then record the updated state in an appropriate Camera State field of camera/site parameters database 396.

Figure 19:
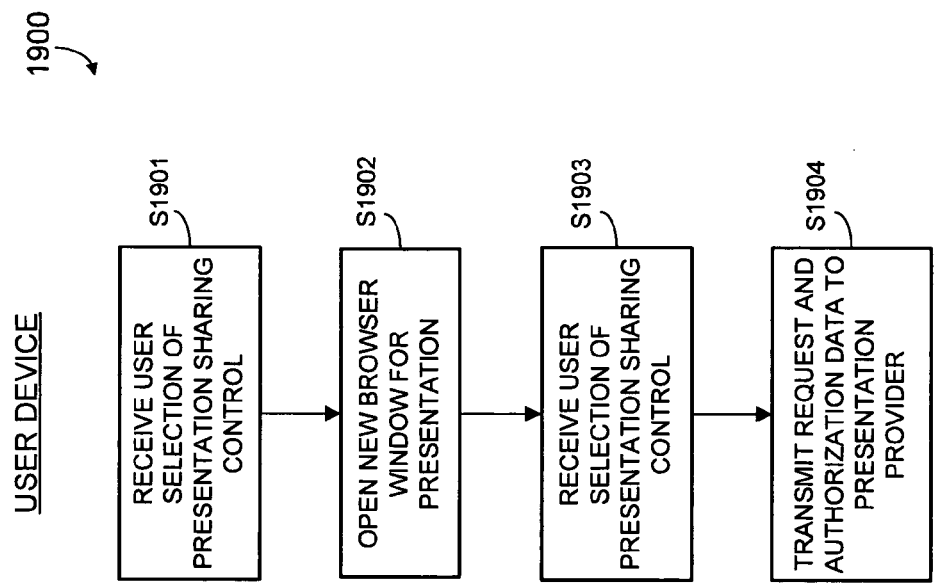
FIG. 19 is a flow diagram of process steps according to some embodiments.
Figure 20:
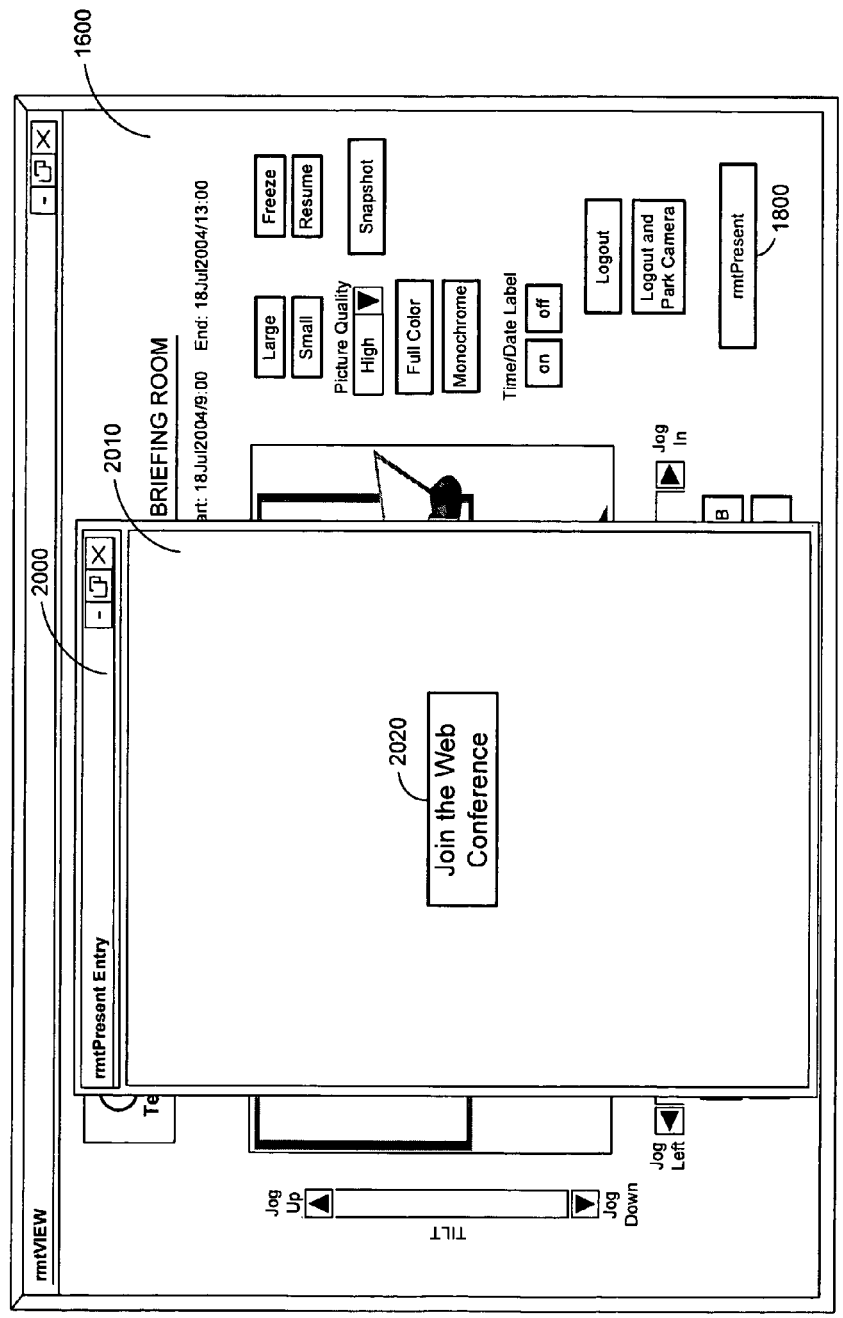
FIG. 20 is an outward view of a user interface according to some embodiments.

FIG. 19 is a flow diagram of process steps 1900 to provide support for presentation sharing control 1800 of FIG. 18. User device 100 initially receives a user selection of presentation sharing control at step S1901. Web browser 191 then opens a new browser window at step S1902 in response to code associated with control 1800. FIG. 20 illustrates window 2000 that is opened in some embodiments of step S1902.

Window 2000 displays Web page 2010 including presentation sharing control 2020. Presentation sharing control 2020 may be associated with a URL of a Web-based presentation sharing service, such as WebEx™ or Live Meeting™. The Web-based presentation sharing service may be affiliated with the entity operating server 300. A user selection of control 2020 is received at step S1903. Accordingly, user device 100 uses the URL to transmit a request to launch a Web-based presentation sharing application at step S1904.

Code of Web page 2010 may also associate presentation sharing control 2020 with authorization information that was originally transmitted to server 300 at step S905. User device 100 may transmit this authorization with the request in step S1904. Consequently, the user may avoid reentering authorization information in a login page of the Web-based presentation sharing service.

Figure 21:
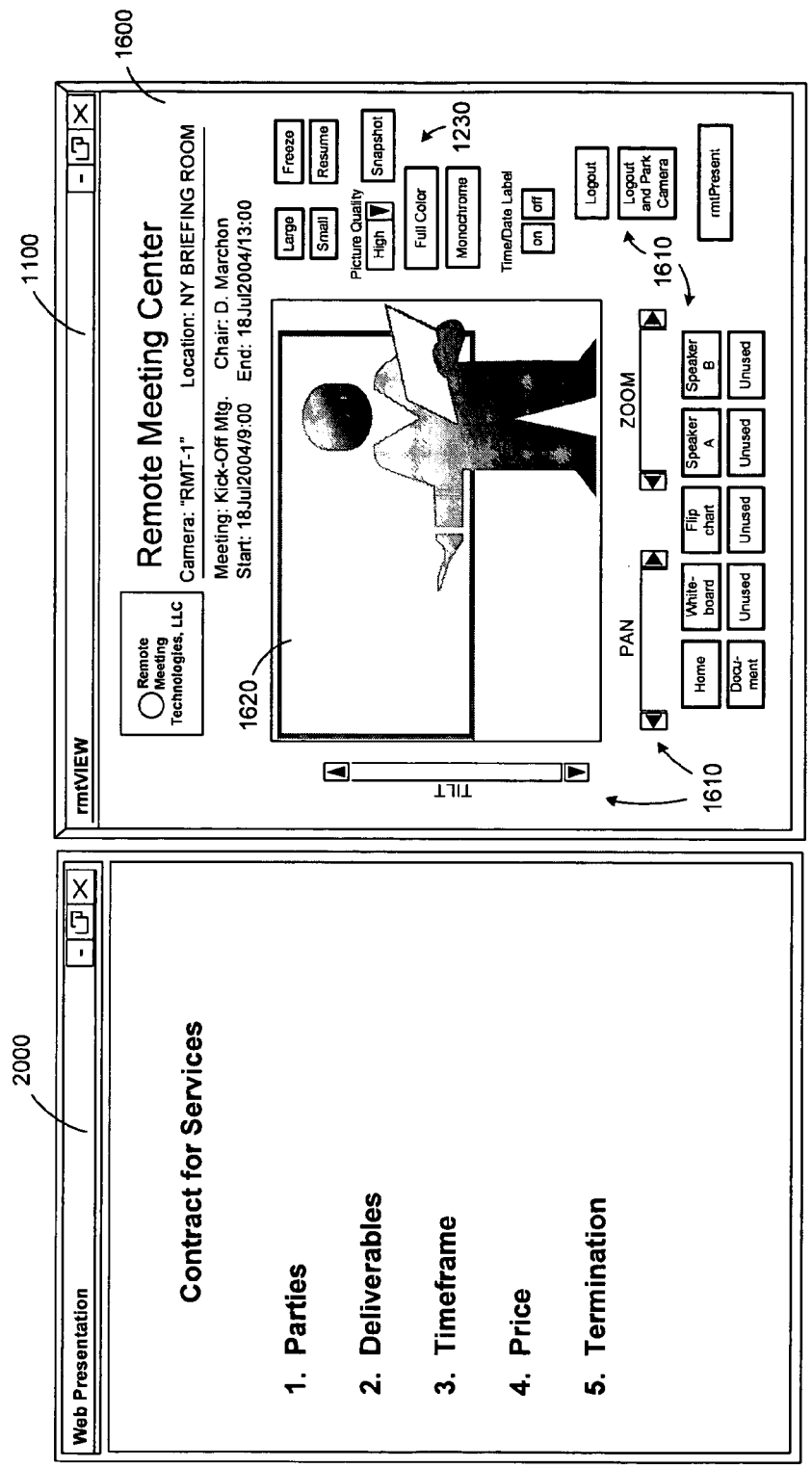
FIG. 21 is an outward view of a user interface according to some embodiments.

FIG. 21 shows the Web-based presentation sharing application launched within window 2000. Browser window 1110 has been resized so that Web page 1600 can be viewed simultaneously with window 2000. Frame 1620 continues to display video data received from video source 200, and controls 1230 and 1610 remain active to provide functionality as described above.

FIGS. 22 through 32 comprise outward views of interfaces that may be used to perform administrative functions. The interfaces may be provided by Web-based application 391 and Web server 392 of server 300, and may be accessed via a Web browser executed by any device in communication therewith.

Figure 22:
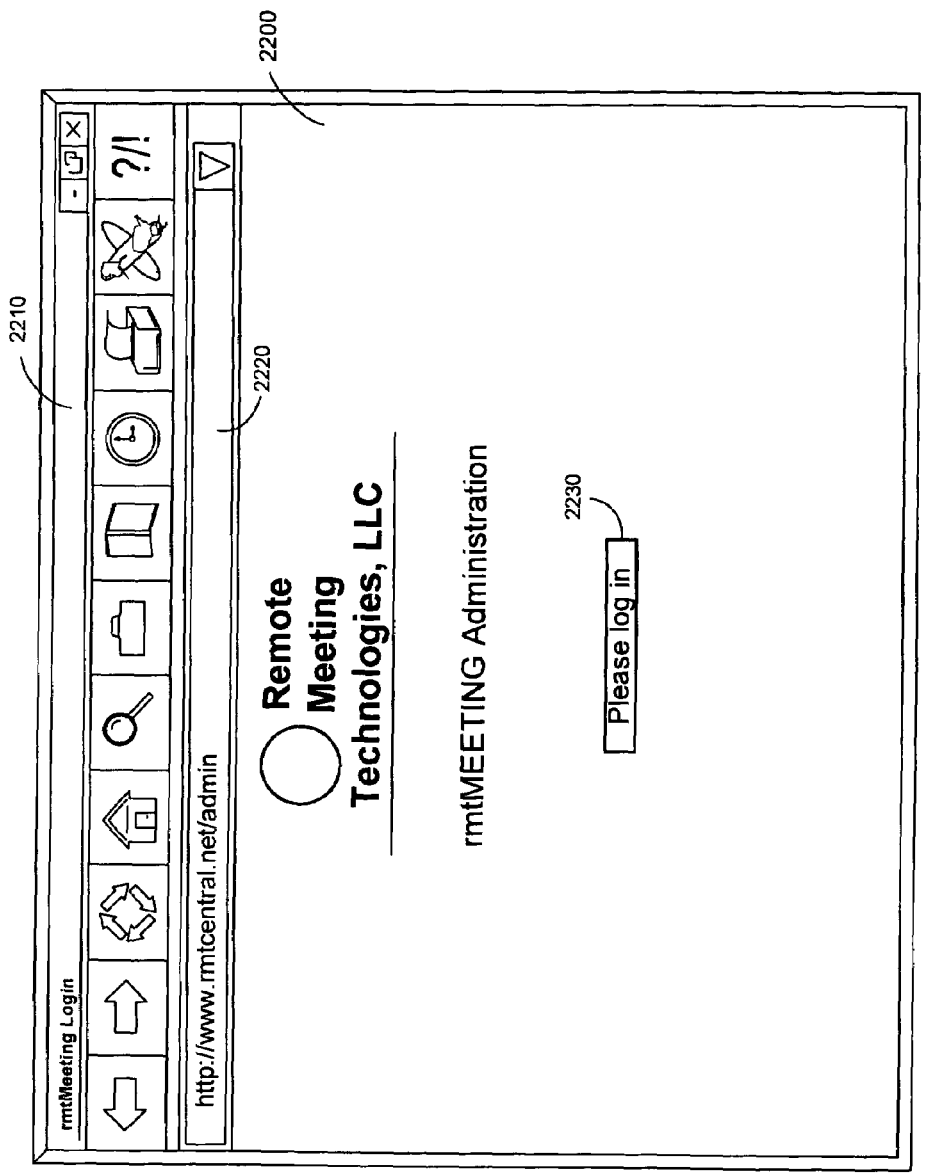
FIG. 22 is an outward view of a user interface according to some embodiments.

FIG. 22 shows Web page 2200 within browser window 2210. Web page 2200 was accessed in response to entry of its URL into address bar 2220. Button 2230 may be selected to cause a new browser window to open and to display a Web page retrieved using a second URL.

Figure 23:
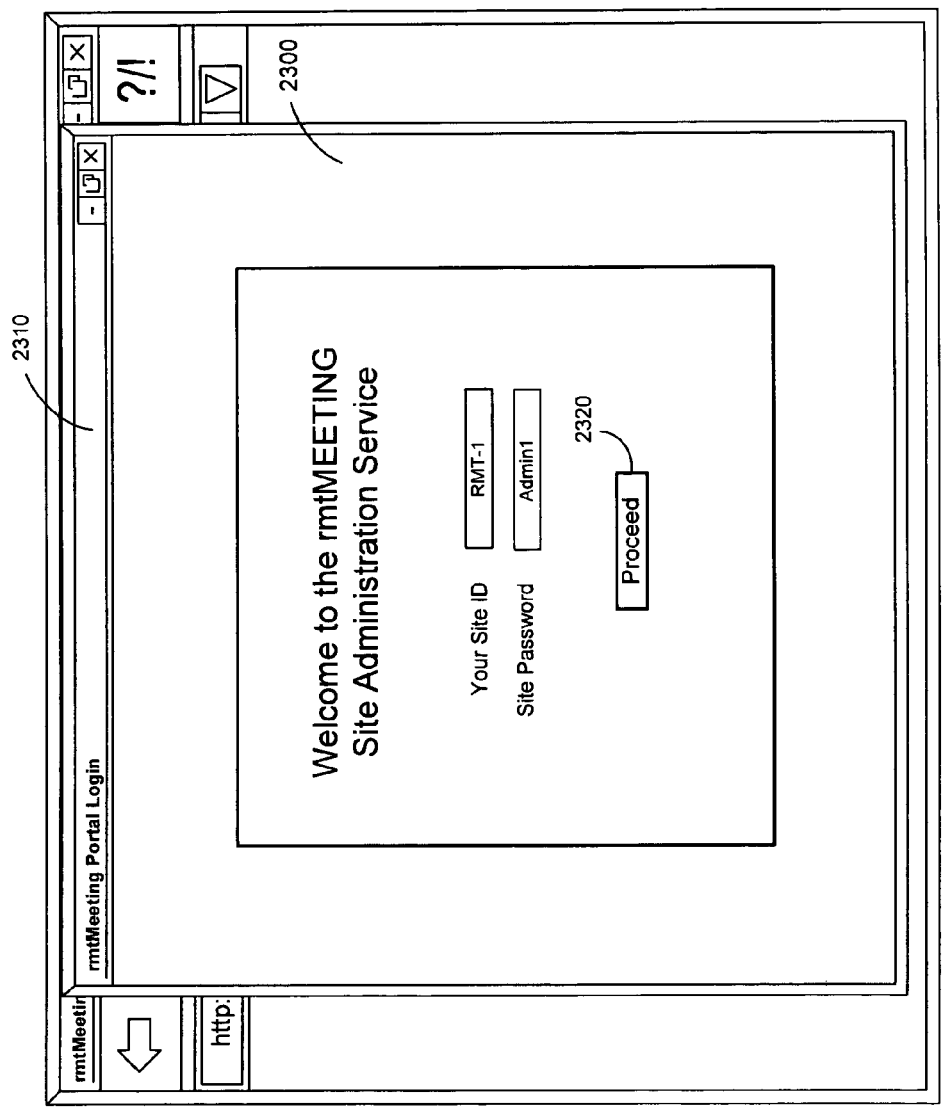
FIG. 23 is an outward view of a user interface according to some embodiments.
Figure 24:
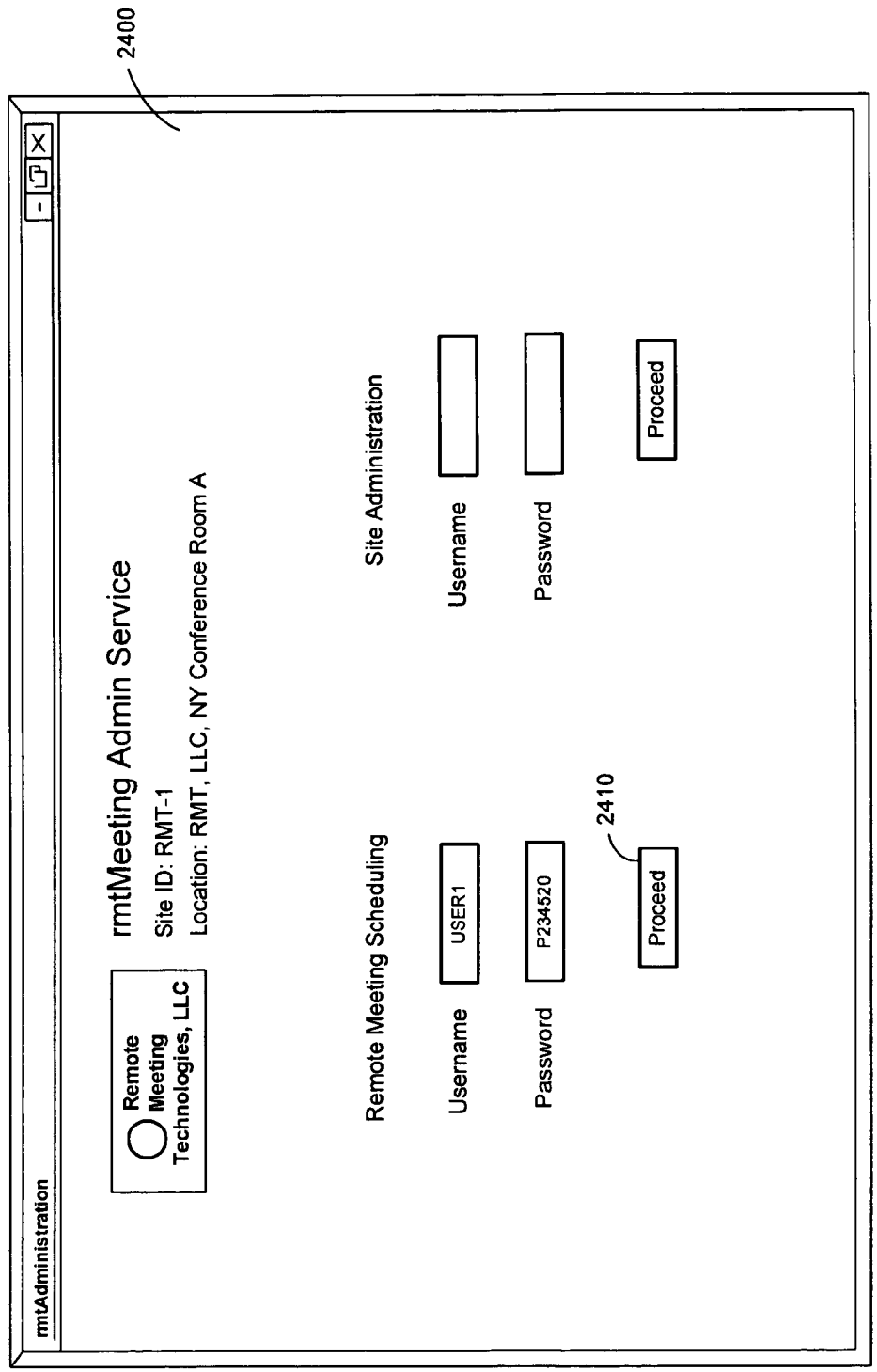
FIG. 24 is an outward view of a user interface according to some embodiments.

FIG. 23 shows Web page 2300 as displayed in new browser window 2310. Web page 2300 includes fields for entering authorization information. A user may input authorization information into Web page 2300 and selects "proceed" control 2320 to transmit the authorization information to server 300.

Server 300 checks the received authorization information against the first two fields of password database 393. If a match is found, server 300 transmits Web page 2400 of FIG. 24 to user device 100. Web page 2400 includes fields for entering authorization information, with one set of fields being associated with "Remote Meeting Scheduling" and another set of fields being associated with "Site Administration". For purposes of the present example, it will be assumed that authorization information is entered into the "Remote Meeting Scheduling" fields and "proceed" control 2410 is selected.

The authorization information is received by server 300 and is compared with the Schedule Administration/Username and Schedule Adminstration/Password fields associated with the current Site Id in database 393. More than one Schedule Administration/Username and Schedule Adminstration/Password may be associated with a particular Site Id.

Figure 25:
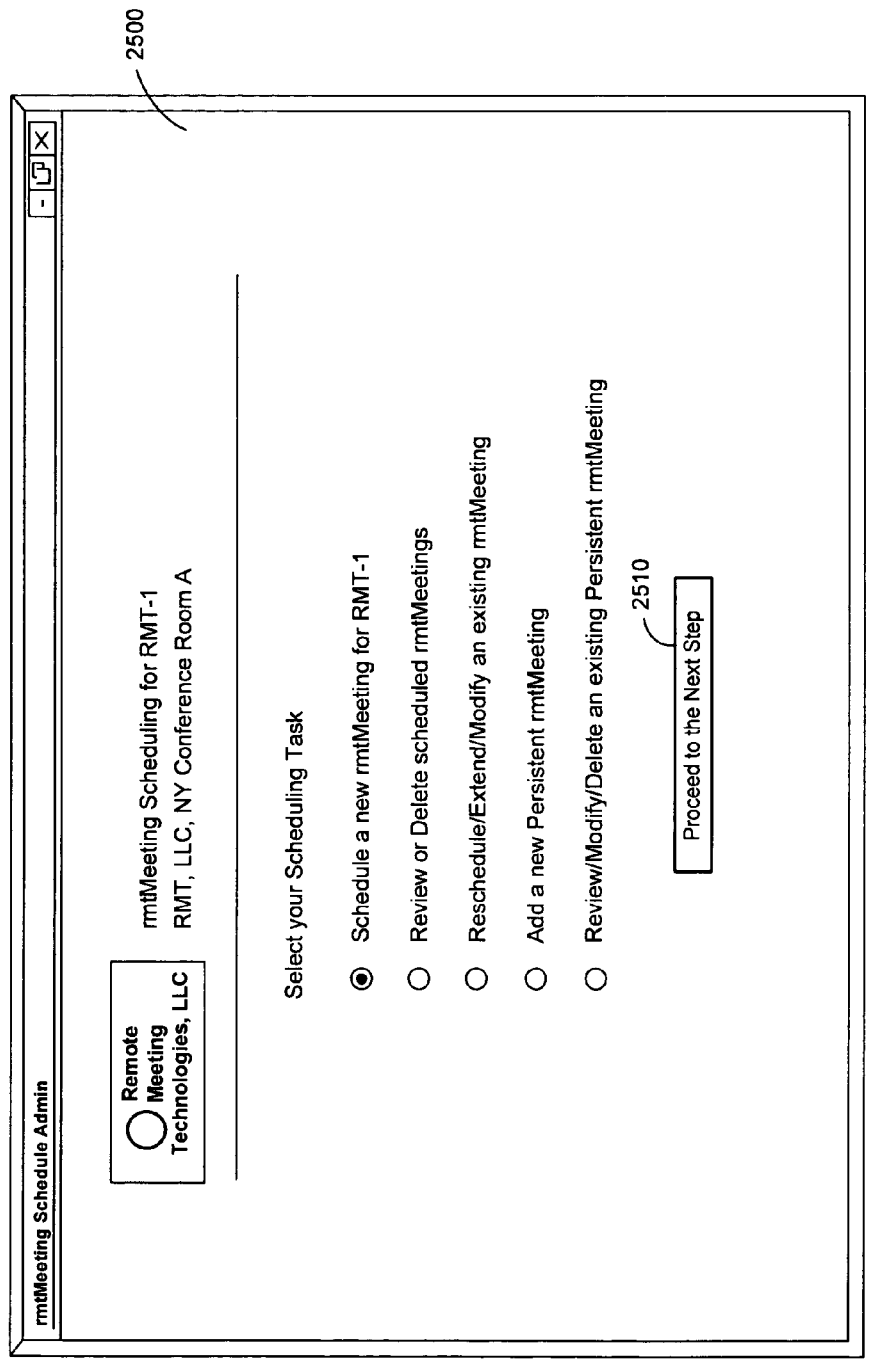
FIG. 25 is an outward view of a user interface according to some embodiments.
Figure 26:
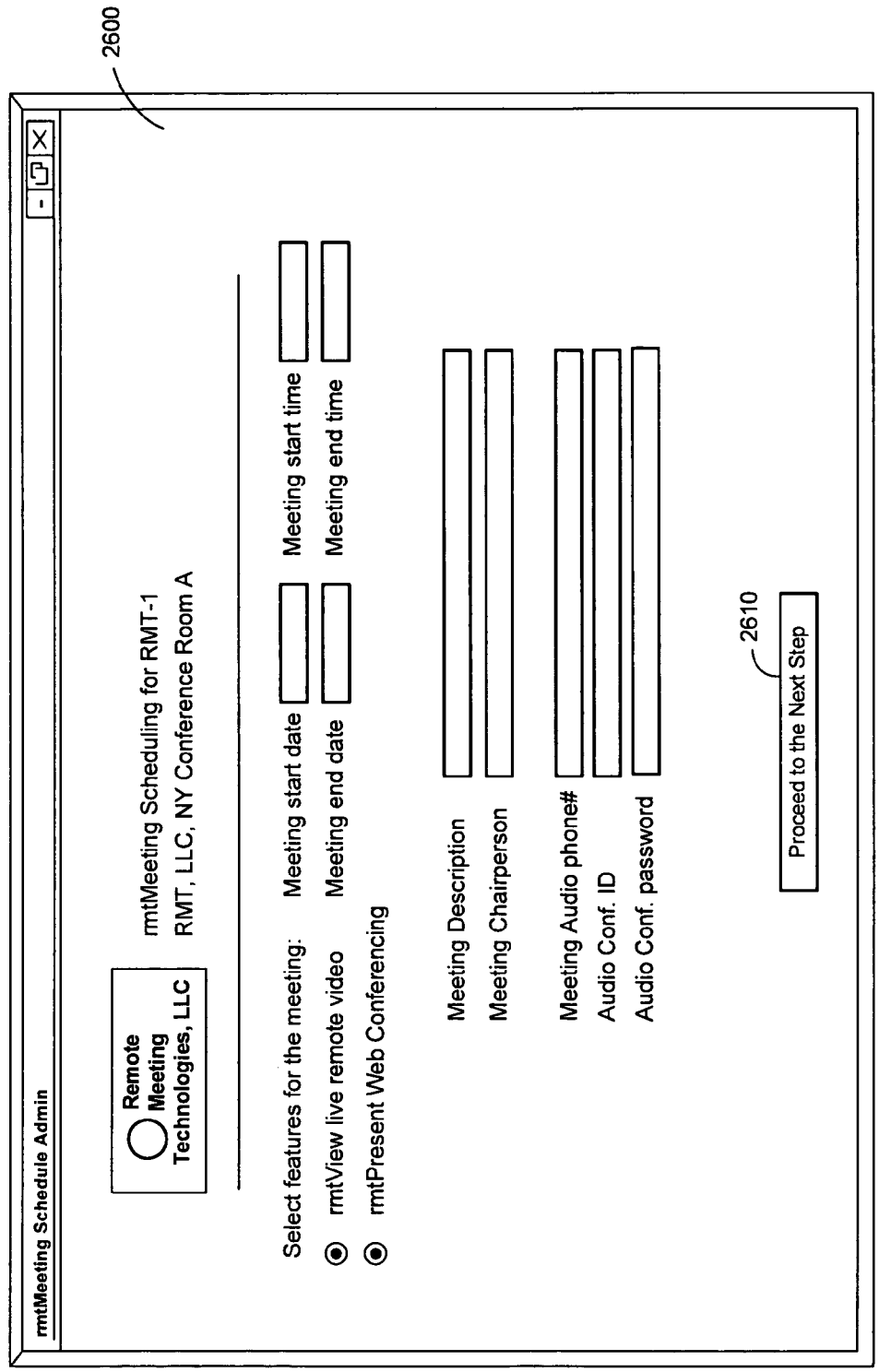
FIG. 26 is an outward view of a user interface according to some embodiments.

Server 300 transmits Web page 2500 of FIG. 25 if the received authorization information is valid. Web page 2500 provides six scheduling options. The first scheduling option "Schedule a new rmtMeeting for RMT-1" is selected and control 2510 is selected. As a result, Web page 2600 of FIG. 26 is retrieved from server 300.

Web page 2600 allows a user to specify parameters of a remote meeting. Upon selection of control 2610, Web page 2700 of FIG. 27 is displayed. Web page 2700 allows the user to confirm parameters specified in page 2600, and allows the user to specify details regarding each meeting participant. For example, Web page 2700 also allows the user to specify a user to act as a moderator in any Web-based presentation sharing application that is launched during the subject meeting.

Web page 2700 also displays a unique username and password for each participant. The username and password may be randomly generated by Web-based application 391. Also included in Web page 2700 are fields to specify participant contact information including an e-mail address. The e-mail address may be used to transmit meeting parameters to the participant such as meeting time, Site Id, Username and Password. The e-mail may be transmitted upon user selection of "Add this Meeting" control 2710. In addition, Server 300 may store the parameters of the meeting in meeting database 394 upon selection of control 2710.

"Review or Delete Scheduled rmtMeetings" option of Web page 2500 may be selected to view a page including the meeting parameters associated with a meeting, and to delete the meeting if desired. The page is generated using data from a portion of meeting database 394 that is associated with the meeting. A portion of meeting database 394 that stores parameters of a meeting may be deleted if the meeting is deleted using the "Review or Delete Scheduled rmtMeetings" option.

Web page 2500 also includes a "Reschedule/Extend/Modify an existing rmtMeeting" option. Selecting this option provides a Web page usable to change parameters associated with a scheduled meeting. Fields of meeting database 394 are modified based on any such changes.

Figure 28:
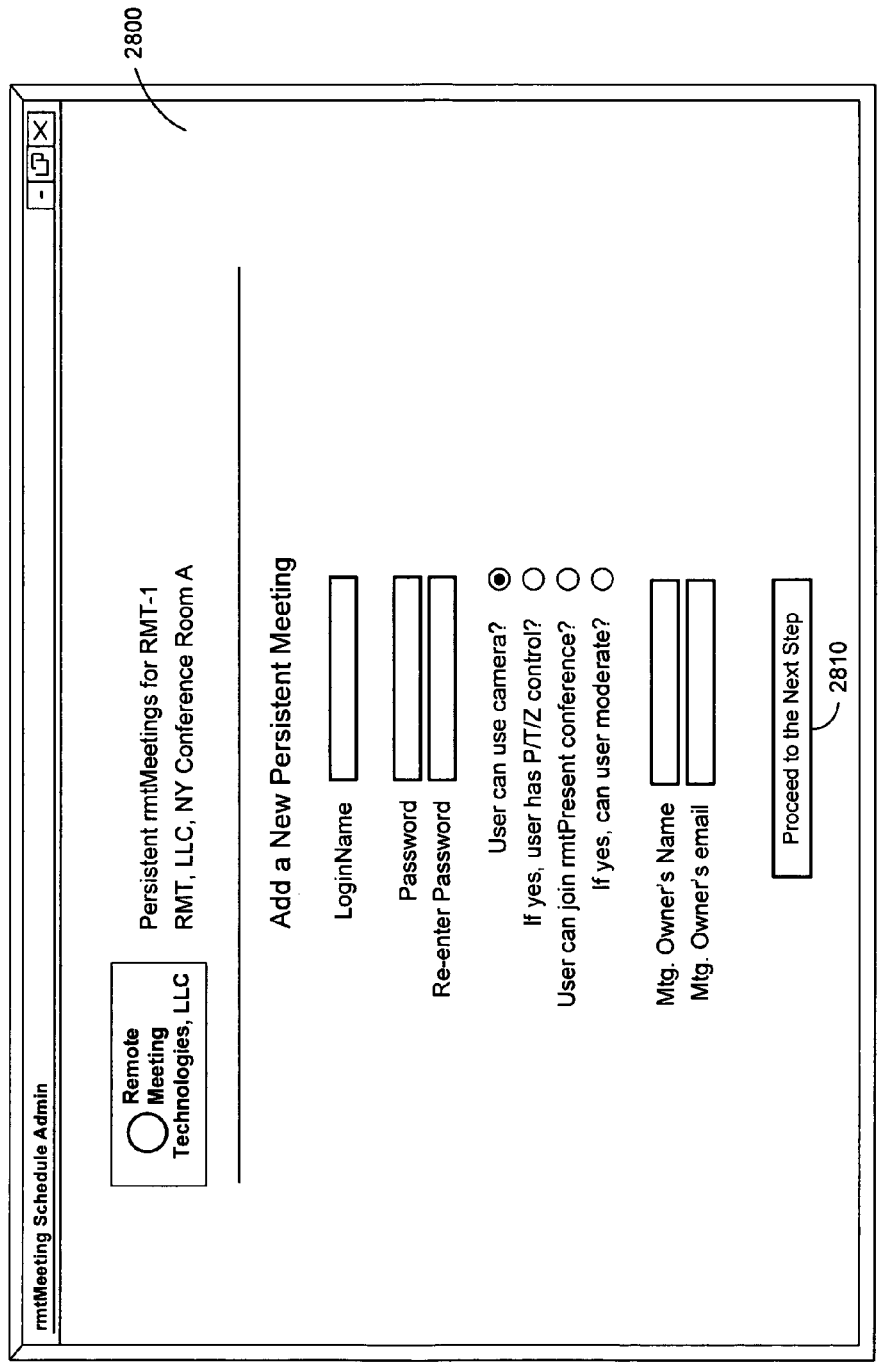
FIG. 28 is an outward view of a user interface according to some embodiments.

The "Add a new Persistent Meeting" option of Web page 2500 causes user device 100 to display Web page 2800 of FIG. 28. Web page 2800 allows a user to specify parameters of a persistent meeting, which is a meeting having no predefined end time. These parameters may also be stored in meeting database 394 upon selection of control 2810.

The final option of Web page 2500 is a "Review/Modify/Delete an existing Persistent rmtMeeting" option. This option allows a user to review parameters of a persistent meeting stored in database 394, to modify the parameters if desired, and to delete the meeting if desired. Meeting database 394 may be modified to reflect any modifications or deletions made using this option.

Returning to Web page 2400, authorization information may also be entered into the "Site Administration" fields thereof. After "proceed" control 2410 is selected, the authorization information is received by server 300 and is compared with the SiteAdministration/Username and Site Adminstration/Password fields associated with the current Site Id in database 393. Again, more than one Site Administration/Username and Site Adminstration/Password may be associated with a particular Site Id.

Figure 29:
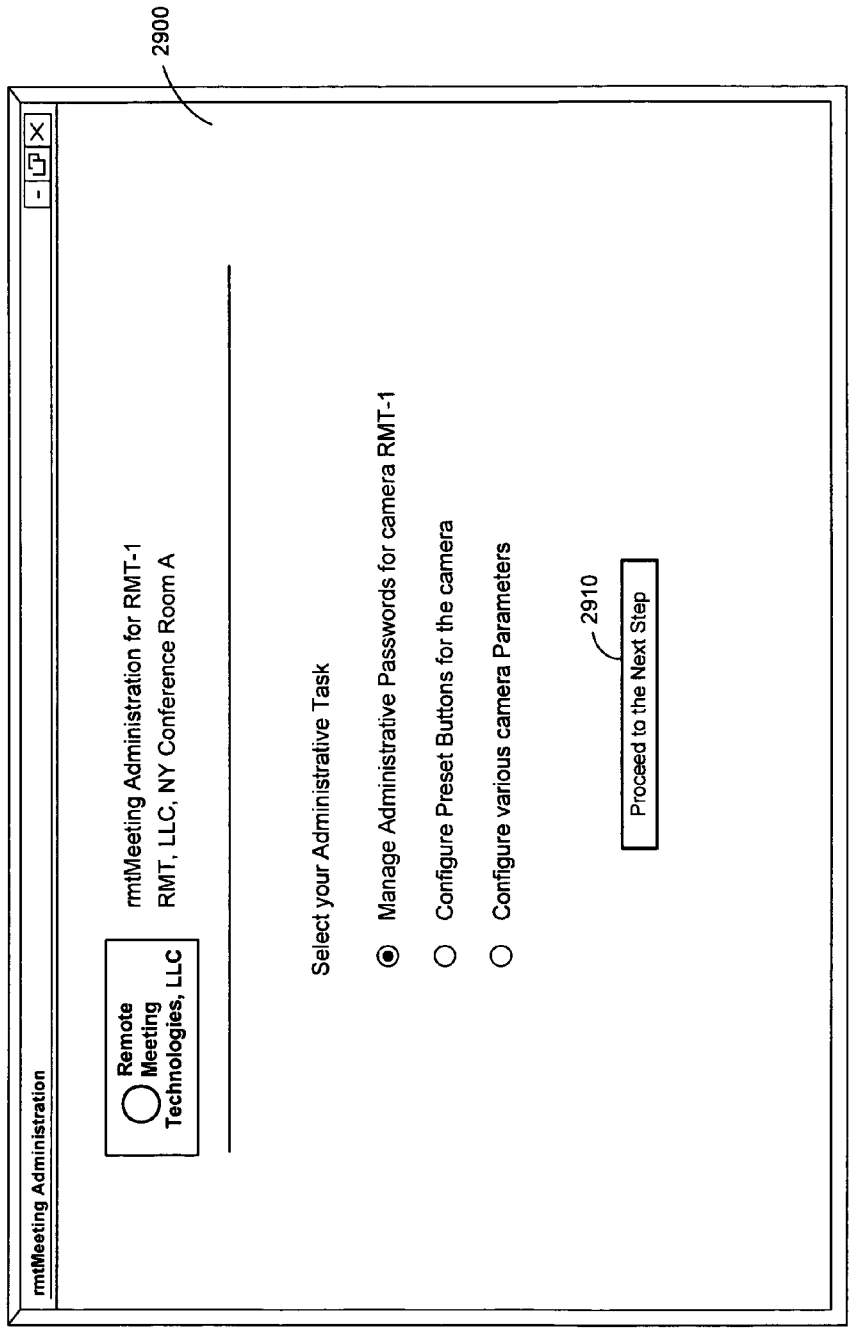
FIG. 29 is an outward view of a user interface according to some embodiments.

If the received authorization information is valid, Server 300 transmits Web page 2900 of FIG. 29. Web page 2900 provides three administrative options, the first of which is "Manage Administrative Passwords for camera RMT-1". Selecting the first option and control 2910 causes user device 100 to retrieve and display Web page 3000.

Web page 3000 includes fields 3010, 3020 and 3030 for receiving authorization information. A user may create a new site password using fields 3010. The new password is entered into the Password field associated with the current Site Id in database 393 upon selection of control 3015. New schedule administration and site administration usernames and passwords may be created using fields 3020 and 3030, respectively. Controls 3015 and 3025 may be selected to enter the new usernames and passwords into corresponding fields associated with the current Site Id in database 393.

Option "Configure Preset Buttons for the camera" of page 2900 may be selected to define camera presets. Web page 3100 shows frame 3110 displaying video data from video source 200 and video source controls 3120. Video source controls 3120 may be manipulated until a desired preset image appears in frame 3110. The desired present image is associated with the pan, tilt and zoom settings specified by controls 3120 when the desired preset image is displayed in frame 3110. The pan, tilt and zoom settings may then be assigned to one of preset buttons 3130 using controls 3140. Names may be also assigned to each preset button using controls 3140.

The pan, tilt and zoom settings associated with the assigned presets are stored in camera presets database 395. Accordingly, server 300 may use camera preset database 395 to generate a "Host" meeting Web page such as Web page 1600. More particularly, the "Host" meeting Web page may be generated to include code that associates each preset button 1615 with pan, tilt and zoom settings stored in database 395.

Figure 32:
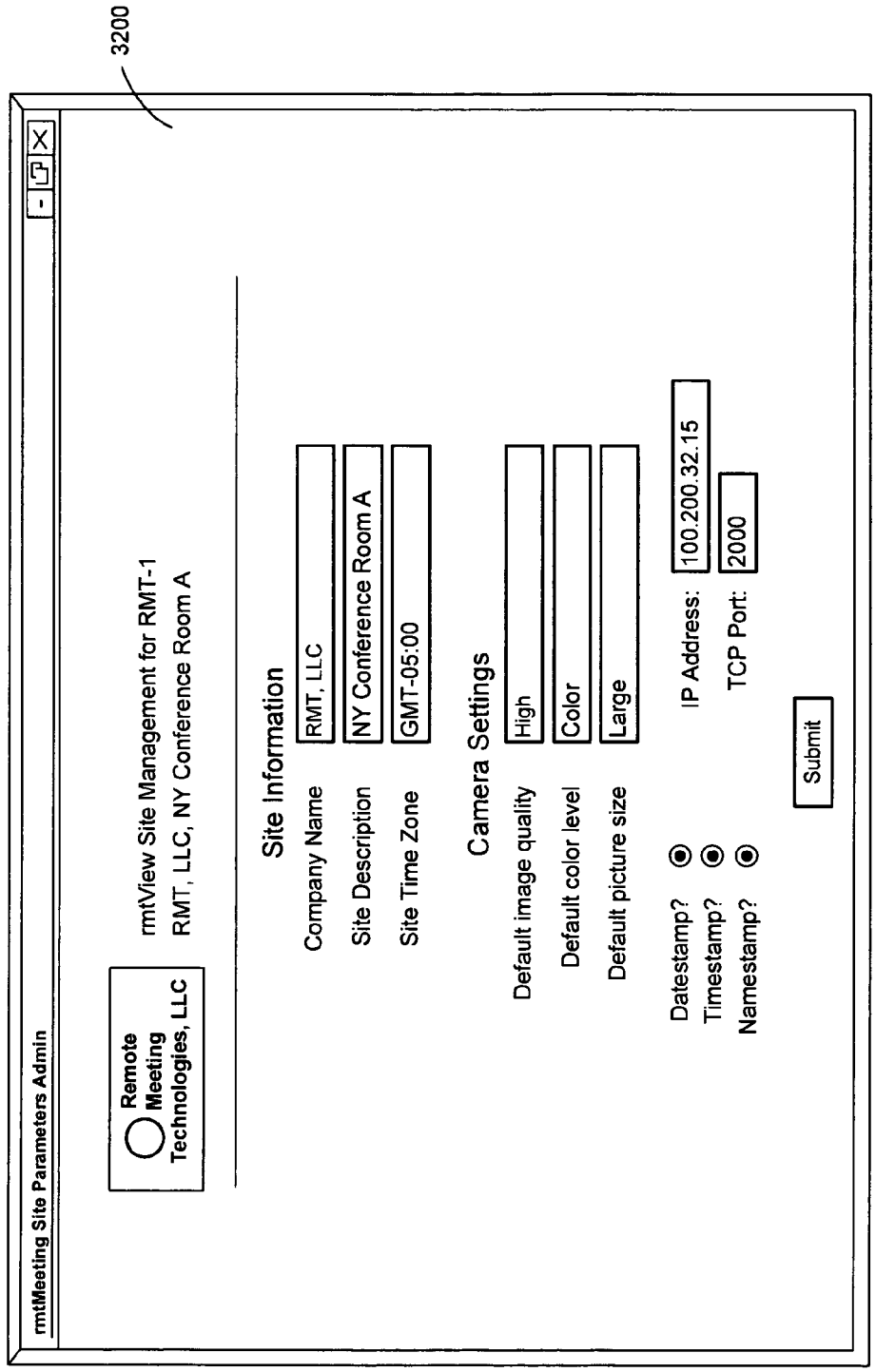
FIG. 32 is an outward view of a user interface according to some embodiments.

The last option of Web page 2900 is a "Configure various camera parameters" option. Web page 3200 of FIG. 32 is retrieved if this last option is selected. Web page 3200 allows a user to specify particular camera and site parameters. The parameters may then be submitted for storage in camera/site parameters database 396.

Figure 33:
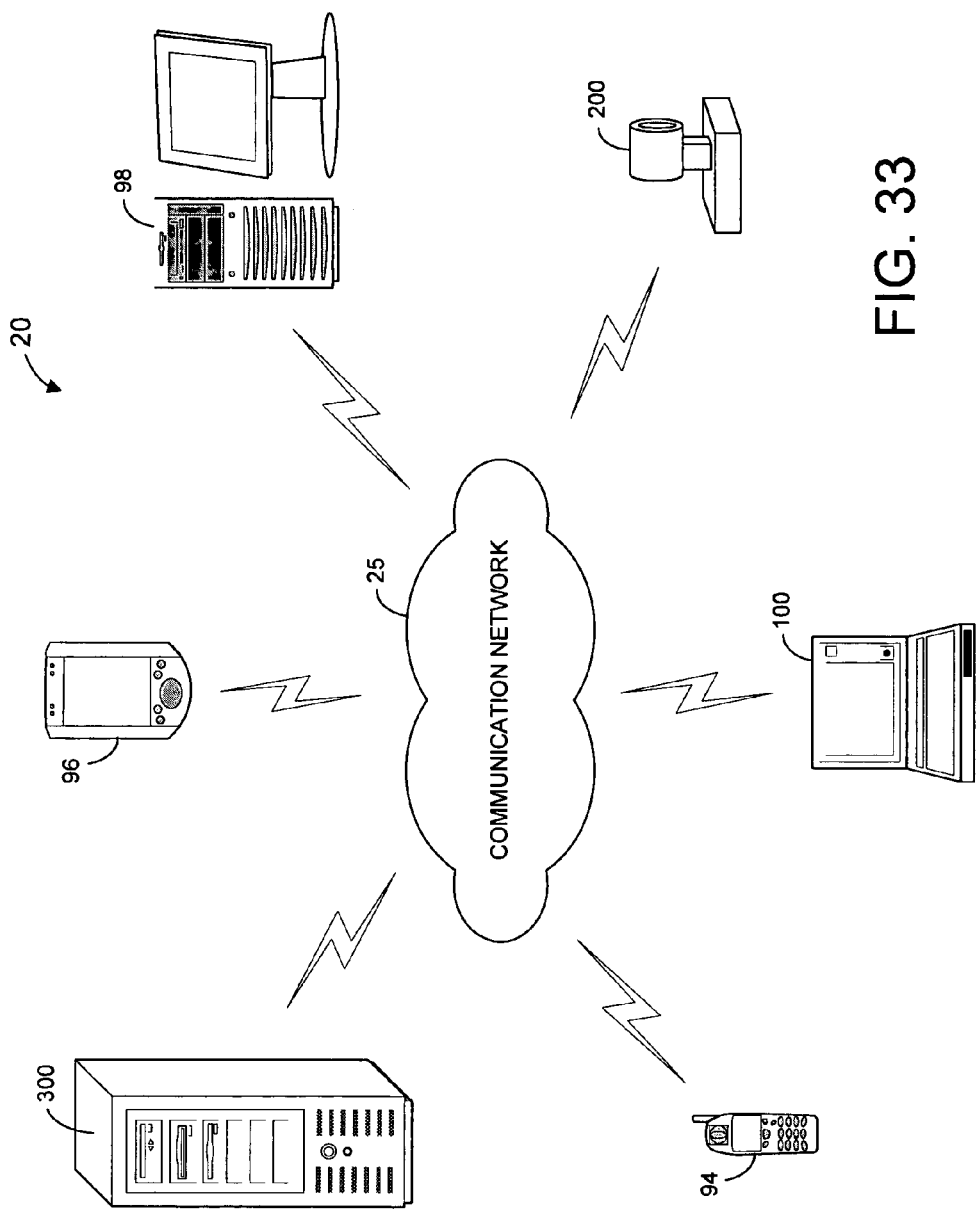
FIG. 33 is a diagram of a system architecture according to some embodiments.

FIG. 33 is a diagram of system architecture 20 according to some embodiments. System architecture 20 reflects a "one-to-many" topography, with communication network comprising any combination of currently- or hereafter-known networking media, configurations and protocols. More specifically, each of user devices 94 through 100 may communicate with video source 200 and server 300 as described above in order to receive a meeting Web page that displays video data received directly from video source 200. One or more of the meeting Web pages received by user devices 94 through 100 may be "Guest" Web pages such as Web page 1200 or "Host" Web pages such as Web page 1600. Accordingly, more than one of user devices 94 through 100 may transmit requests to control video source 200 to video source 200.

Figure 34:
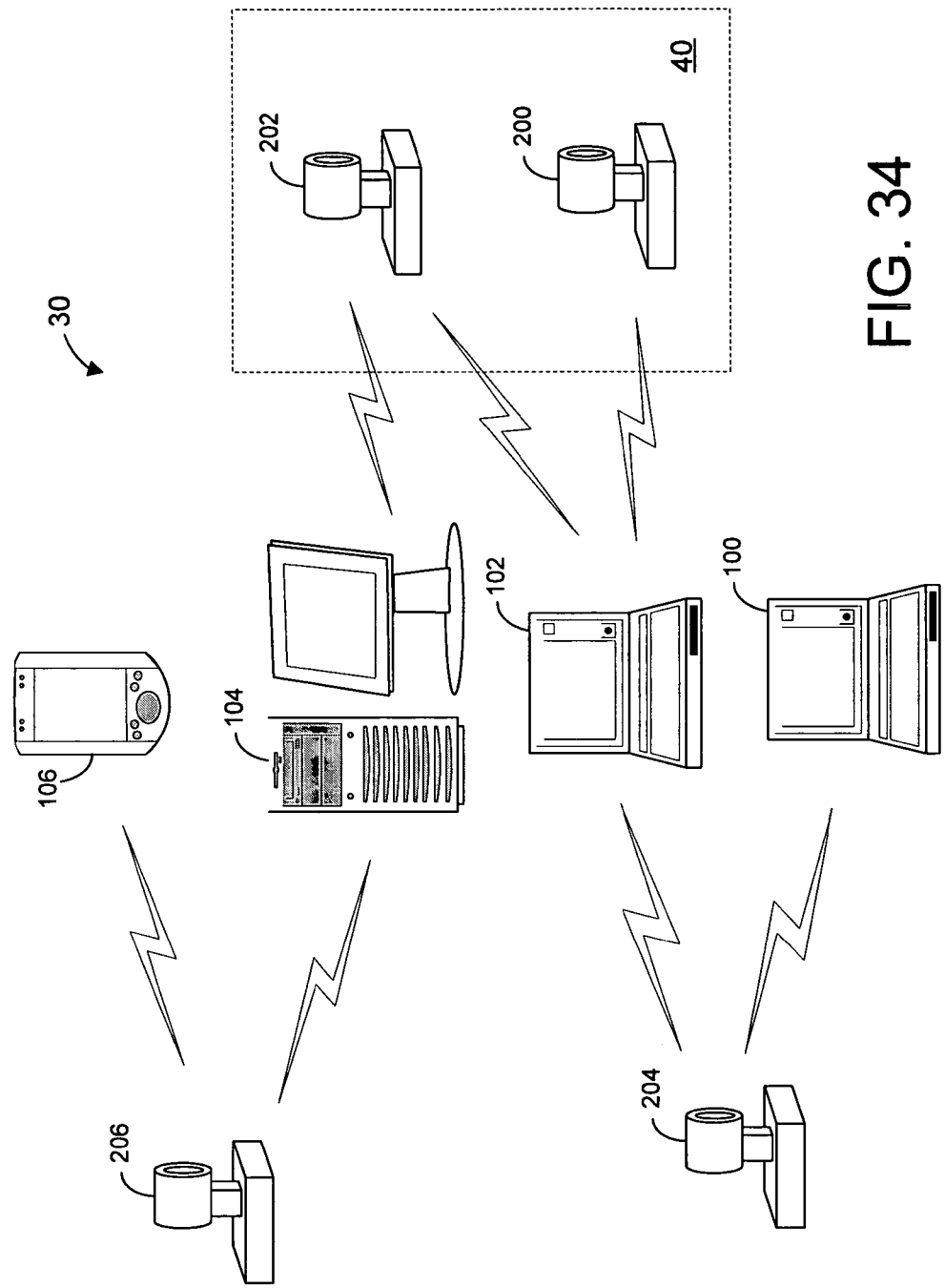
FIG. 34 is a diagram of a system architecture according to some embodiments.

FIG. 34 is a diagram of system architecture 30 according to some embodiments. System architecture 30 shows user device 100 through 106 in communication with various ones of video sources 200 through 206. Each of user devices 100 through 106 may receive video data from each one of video sources 200 through 206 with which it communicates and display the video data in a Web page as described above.

Each of user devices 100 through 106 is also in communication with at least one server (not shown) that operates as described above. In some embodiments, one server may operate to provide a user device with access to video data from more than one video source. As illustrated in FIG. 33, one server may also or alternatively operate to provide more than one user device with access to video data from a single video source.

Video sources 200 and 202 are located in room 40. Such an arrangement may provide a user device such as user device 202 with two sets of video data that originate at a same meeting location. A user device (e.g. user device 104) may operate to request video data from only one video source (e.g. video source 202) that is located in a room with one or more other video sources.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A method comprising:
receiving a Web page request by a first device;
transmitting a Web page from the first device to a user device in response to the request, the Web page comprising meeting information, a video frame, a video control, and code usable by a Web browser of the user device to transmit a request for video data to a remote video source;
transmitting the request for the video data from the user device to the remote video source by executing the code;
receiving the video data directly from the remote video source by the user device;
displaying the Web page and the video data by the user device, wherein the video data is integrated into the video frame of the Web page and is displayed in a first video format;
receiving a user selection of the video control by the user device;
transmitting a second Web page request to the first device from the user device in response to the user selection;
transmitting a second Web page from the first device to the user device in response to the second request, the second Web page comprising the meeting information, a second video frame, the video control, and second code usable by the Web browser to transmit a second request for second video data to the remote video source;
transmitting the second request for the second video data from the user device to the remote video source by executing the second code;
receiving the second video data directly from the remote video source by the user device; and
displaying the Web page and the second video data by the user device,
wherein the second video data is integrated into the second video frame of the Web page and is displayed in a second video format.

2. A method according to claim 1, further comprising:
generating a token; and
transmitting the token to the remote video source,
wherein transmitting the Web page comprises transmitting the token to the user device.

3. A method according to claim 2, wherein the remote video source transmits the video data directly to the user device if the transmitted token is associated with a token received from the user device with the request for video data.

4. A method according to claim 1, wherein the Web page further comprises code usable by a Web browser to display video source controls and, upon user selection of the video source controls, to directly control the remote video source based on the selection.

5. A method according to claim 1, wherein receiving the second Web page request comprises receiving a token from the user device, the method further comprising:
after receiving the second Web page request and prior to transmitting the second Web page to the user device, determining that the user device is authorized to receive the video data based on the token.

6. A method according to claim 1, further comprising:
after receiving the second Web page request and prior to transmitting the second Web page to the user device, determining that a meeting associated with the video data is ongoing.

7. A method according to claim 1, wherein the Web page further comprises code usable by a Web browser to display a presentation sharing control and, upon user selection of the presentation sharing control, to transmit an HTTP-based request to launch a Web-based presentation sharing application.

8. A method comprising:
transmitting a Web page request to a first device;
receiving a Web page from the first device in response to the request, the Web page comprising meeting information, a video frame, a video control, and code usable by a Web browser to transmit a request for video data to a remote video source;
transmitting the request for the video data to the remote video source by executing the code of the Web page;
receiving the video data directly from the remote video source;
displaying the Web page and the video data, wherein the video data is integrated into the video frame of the Web page and is displayed in a first video format;
receiving a user selection of the video control;
transmitting a second Web page request to the first device in response to the user selection;
receiving a second Web page from the first device in response to the second request, the second Web page comprising the meeting information, a second video frame, the video control, and second code usable by the Web browser to transmit a second request for second video data to the remote video source;
transmitting the second request for the second video data to the remote video source by executing the second code;
receiving the second video data directly from the remote video source; and
displaying the Web page and the second video data, wherein the second video data is integrated into the second video frame of the Web page and is displayed in a second video format.

9. A method according to claim 8, further comprising:
receiving a token from the first device,
wherein transmitting the request comprises transmitting the token to the remote video source.

10. A method according to claim 9, wherein the video data is received from the remote video source only if the received token is associated with a token received by the remote video source from the first device.

11. A method according to claim 8, further comprising:
displaying a video source control based on code of the Web page;
receiving a user selection of the video source control; and
transmitting a request to control the remote video source to the remote video source based on code of the Web page that is associated with the selected video source control.

12. A method according to claim 8, wherein transmitting the second Web page request comprises transmitting a token to the first device, and wherein the second Web page is received from the first device only if the received token is associated with a token previously-transmitted by the first device.

13. A method according to claim 8, wherein the second Web page is received from the first device only if a meeting associated with the video data is ongoing.

14. A method according to claim 8, further comprising:
displaying a presentation sharing control based on code of the Web page;
receiving a user selection of the presentation sharing control; and
transmitting an HTTP-based request to launch a Web-based presentation sharing application based on code associated with the presentation sharing control.

15. An apparatus comprising:
a storage device to store processor-executable process steps; and
a processor in communication with the storage device and operative to execute the process steps to:
transmit a Web page request to a first device;
receive a Web page from the first device in response to the request, the Web page comprising meeting information, a video frame, a video control, and code usable by a Web browser to transmit a request for video data to a remote video source;
transmit the request for the video data to the remote video source by executing the code of the Web page;
receive the video data directly from the remote video source;
display the Web page and the video data, wherein the video data is integrated into the video frame of the Web page and is displayed in a first video format;
receive a user selection of the video control;
transmit a second Web page request to the first device in response to the user selection;
receive a second Web page from the first device in response to the second request, the second Web page comprising the meeting information, a second video frame, the video control, and second code usable by the Web browser to transmit a second request for second video data to the remote video source;
transmit the second request for the second video data to the remote video source by executing the second code;
receive the second video data directly from the remote video source; and
display the Web page and the second video data, wherein the second video data is integrated into the second video frame of the Web page and is displayed in a second video format.

16. An apparatus according to claim 15, the processor further operative to execute the process steps to:
receive a token from the first device,
wherein transmission of the request comprises transmission of the token to the remote video source.

17. An apparatus according to claim 16, wherein the video data is received from the remote video source only if the received token is associated with a token received by the remote video source from the first device.

18. An apparatus according to claim 15, the processor further operative to execute the process steps to:
display a video source control based on code of the Web page;
receive a user selection of the video source control; and
transmit a request to control the remote video source to the remote video source based on code of the Web page that is associated with the selected video source control.

19. An apparatus according to claim 15, wherein transmission of the second Web page request comprises transmission of a token to the first device, and wherein the second Web page is received from the first device only if the received token is associated with a token previously-transmitted by the first device.

20. An apparatus according to claim 15, wherein the second Web page is received from the first device only if a meeting associated with the video data is ongoing.

21. An apparatus according to claim 15, the processor further operative to execute the process steps to:
  display a presentation sharing control based on code of the Web page;
  receive a user selection of the presentation sharing control; and
  transmit an HTTP-based request to launch a Web-based presentation sharing application based on code associated with the presentation sharing control.

22. A system comprising:
  a user device to transmit a Web page request;
  a first device to transmit a Web page to the user device in response to the request, the Web page comprising meeting information, a video frame, a video control, and code usable by a Web browser of the user device to transmit a request for video data; and
  a remote video source to receive the request for the video data from the user device, and to transmit the video data directly to the user device,
  wherein the user device is further to:
    receive the video data directly from the remote video source;
    display the Web page and the video data, wherein the video data is integrated into the video frame of the Web page and is displayed in a first video format;
    receive a user selection of the video control;
    transmit a second Web page request to the first device in response to the user selection;
    receive a second Web page from the first device in response to the second request, the second Web page comprising the meeting information, a second video frame, the video control, and second code usable by the Web browser to transmit a second request for second video data to the remote video source;
    transmit the second request for the second video data to the remote video source by executing the second code;
    receive the second video data directly from the remote video source; and
    display the Web page and the second video data, wherein the second video data is integrated into the second video frame of the Web page and is displayed in a second video format.

23. A system according to claim 22, wherein the user device transmits the request and authorization data to the first device, and
  wherein the first device validates the authorization data, transmits a token to the user device, and transmits the token to the remote video source.

24. A system according to claim 23, wherein the remote video source receives the request for video data and a request token from the user device, determines if the request token is associated with the token received from the first device, and transmits the video data directly to the user device only if the request token is associated with the token received from the first device.

25. A system according to claim 22, wherein the user device displays a video source control based on code of the Web page, receives a user selection of the video source control, and transmits a request to control the remote video source to the remote video source based on code of the Web page that is associated with the selected video source control, and
  wherein the remote video source receives the request to control the remote video source, executes a control function based on the request to control the remote video source, and transmits new video data directly to the user device.

26. A system according to claim 22, wherein transmission of the second Web page request comprises transmission of a token to the first device, and
  wherein the first device determines if the received token is associated with a token previously-transmitted by the first device to the user device, and transmits the second Web page to the user device only if the received token is associated with the previously-transmitted token.

27. A system according to claim 22, wherein the first device determines if a meeting associated with the video data is ongoing, and transmits the second Web page to the user device only if a meeting associated with the video data is ongoing.

28. A system according to claim 22, the user device displays a presentation sharing control based on code of the Web page, receives a user selection of the presentation sharing control, and transmits an HTTP-based request to launch a Web-based presentation sharing application based on code associated with the presentation sharing control.

* * * * *